(12) United States Patent
Kim et al.

(10) Patent No.: US 10,719,180 B2
(45) Date of Patent: Jul. 21, 2020

(54) DISPLAY DEVICE

(71) Applicant: Samsung Display Co., Ltd., Yongin-si (KR)

(72) Inventors: Sunghwan Kim, Yongin-si (KR); Gwang-bum Ko, Suwon-si (KR); Doik Kim, Suwon-si (KR); Janghui Kim, Suwon-si (KR); Seunghwan Chung, Seongnam-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 15 days.

(21) Appl. No.: 16/013,944

(22) Filed: Jun. 21, 2018

(65) Prior Publication Data

US 2019/0138124 A1 May 9, 2019

(30) Foreign Application Priority Data

Nov. 3, 2017 (KR) .......................... 10-2017-0146238

(51) Int. Cl.
*G06F 3/044* (2006.01)
*G09G 3/3208* (2016.01)
(Continued)

(52) U.S. Cl.
CPC .............. *G06F 3/044* (2013.01); *G06F 3/047* (2013.01); *G06F 3/0416* (2013.01); *G09G 3/3208* (2013.01); *G09G 3/3266* (2013.01); *G06F 2203/04112* (2013.01); *G09G 2310/0264* (2013.01); *G09G 2310/0286* (2013.01); *G09G 2310/08* (2013.01); *G09G 2354/00* (2013.01)

(58) Field of Classification Search
CPC ......... G06F 2203/04112; G06F 3/0416; G06F 3/044; G06F 3/047; G09G 2310/0264; G09G 2310/0286; G09G 2310/08; G09G 2354/00; G09G 3/3208; G09G 3/3266
See application file for complete search history.

(56) References Cited

U.S. PATENT DOCUMENTS 8,698,767 B2 4/2014 Kwak et al.
8,730,191 B2 5/2014 Kim et al.
(Continued)

FOREIGN PATENT DOCUMENTS

KR 10-2015-0025778 3/2015
KR 10-1546169 8/2015
(Continued)

*Primary Examiner* — Afroza Chowdhury
(74) *Attorney, Agent, or Firm* — H.C. Park & Associates, PLC

(57) ABSTRACT

A display device includes a display panel including a base film and a circuit layer disposed on the base film, the circuit layer including a plurality of gate lines, a plurality of data lines, and a gate driving unit configured to receive gate control signals and provide a gate signal to the plurality of gate lines, and a sensing unit including a plurality of driving electrodes, a plurality of sensing electrodes, a sense driving unit configured to receive driving control signals and provide a sense driving signal to the plurality of driving electrodes, and sensing pads configured to transfer, to the outside, an electric signal received from each of the plurality of sensing electrodes, wherein the sense driving unit is included in the circuit layer.

12 Claims, 17 Drawing Sheets

(51) Int. Cl.
    *G06F 3/047*     (2006.01)
    *G06F 3/041*     (2006.01)
    *G09G 3/3266*     (2016.01)

(56) References Cited

U.S. PATENT DOCUMENTS

| | | |
|---|---|---|
| 8,866,756 B2 | 10/2014 | Kwak et al. |
| 9,323,372 B2 | 4/2016 | Kim et al. |
| 9,513,732 B2 | 12/2016 | Zhao |
| 9,746,972 B2 | 8/2017 | Kim |
| 9,823,765 B2 * | 11/2017 | Lee ................ G06F 3/0412 |
| 9,823,800 B2 | 11/2017 | Jin |
| 9,864,472 B2 | 1/2018 | Yang et al. |
| 2008/0018613 A1 * | 1/2008 | Kim ................ G06F 3/0412 |
| | | 345/173 |
| 2011/0242021 A1 | 10/2011 | Jun et al. |
| 2011/0291994 A1 | 12/2011 | Kwak et al. |
| 2012/0087459 A1 * | 4/2012 | Nakamizo ........ G09G 3/3677 |
| | | 377/64 |
| 2014/0118641 A1 * | 5/2014 | Ryu ................ G06F 1/1692 |
| | | 349/12 |
| 2014/0132534 A1 * | 5/2014 | Kim ................ G06F 3/0412 |
| | | 345/173 |
| 2016/0260385 A1 * | 9/2016 | Kawano ........... G09G 3/3258 |
| 2017/0052635 A1 * | 2/2017 | Yu .................. G06F 3/044 |
| 2018/0096645 A1 * | 4/2018 | Lee ................ G09G 3/2092 |
| 2018/0120992 A1 * | 5/2018 | Lee ................ G06F 3/0416 |

FOREIGN PATENT DOCUMENTS

| | | |
|---|---|---|
| KR | 10-2016-0031679 | 3/2016 |
| KR | 10-2016-0046965 | 5/2016 |

\* cited by examiner

DISPLAY DEVICE

CROSS-REFERENCE TO RELATED APPLICATION

This application claims priority from and the benefit of Korean Patent Application No. 10-2017-0146238, filed on Nov. 3, 2017, which is hereby incorporated by reference for all purposes as if fully set forth herein.

BACKGROUND

Field

Exemplary embodiments of the invention relate generally to a display device including a sensing unit.

Discussion of the Background

A display device may recognize, through a sensing unit, a human finger or the like which is in contact with a screen. A touch detection method for the sensing unit includes a variety of methods such as a resistive method, an optical method, a capacitive method, an ultrasonic method, etc. Here, a capacitive-type sensing unit detects whether a touch occurs by using a capacitance which varies when a touch generating means comes into contact with a screen of a display device. The capacitive method may be divided into a mutual capacitive method and a self capacitive method.

A mutual-capacitive-type sensing unit includes driving electrodes and sensing electrodes. When driving signals are applied to the driving electrodes of the sensing unit, a mutual capacitance is formed between the driving electrodes and the sensing electrodes. When a touch is externally applied, a touch IC may recognize an input of the touch by sensing a change amount of the mutual capacitance through the sensing electrodes. The touch IC may be electrically connected to pads electrically connected to the driving electrodes and the sensing electrodes, at an outer periphery of an active region in order to transmit the driving signals to the driving electrodes and receive the change amount of the capacitance from the sensing electrodes.

The above information disclosed in this Background section is only for understanding of the background of the inventive concepts, and, therefore, it may contain information that does not constitute prior art.

SUMMARY

Devices constructed according to exemplary embodiments of the invention provide a sensing unit with simplified wirings arranged at an outer periphery of an active region in which driving electrodes and sensing electrodes are arranged.

An exemplary embodiment of the inventive concept provides a display device including: a display panel including a base film and a circuit layer disposed on the base film, the circuit layer including a plurality of gate lines, a plurality of data lines, and a gate driving unit configured to receive gate control signals and provide a gate signal to the plurality of gate lines; and a sensing unit including a plurality of driving electrodes, a plurality of sensing electrodes, a sense driving unit configured to receive driving control signals and provide a sense driving signal to the plurality of driving electrodes, and sensing pads configured to transfer, to the outside, an electric signal received from each of the plurality of sensing electrodes, wherein the sense driving unit is included in the circuit layer.

In an exemplary embodiment, the gate driving unit may include a plurality of gate stages, and the sense driving unit may include a plurality of sense stages, wherein the plurality of gate stages and the plurality of sense stages may be arranged in the same layer.

In an exemplary embodiment, the gate control signals may include a first clock signal, a second clock signal, and a frame start signal, and the driving control signals may include the first clock signal and the second clock signal, wherein a first gate stage among the plurality of gate stages may receive the frame start signal.

In an exemplary embodiment, a first sense stage among the plurality of sense stages may receive a signal output from an nth gate stage (where n is a positive integer) among the plurality of gate stages.

In an exemplary embodiment, the circuit layer may further include a dummy unit electrically connected to the gate driving unit and the sense driving unit, wherein the dummy unit may include at least one dummy stage connected between an nth gate stage among the plurality of gate stages and a first sense stage among the plurality of sense stages.

In an exemplary embodiment, the first sense stage may receive a signal output from the dummy stage.

In an exemplary embodiment, the driving control signals may further include a sense start signal, wherein a first sense stage among the plurality of sense stages may receive the sense start signal.

In an exemplary embodiment, the plurality of gate stages and the plurality of sense stages may be electrically connected.

In an exemplary embodiment, each of the plurality of gate stages and each of the plurality of sense stages may include the same circuit structure.

In an exemplary embodiment, the gate control signals may include a first clock signal, a second clock signal, and a first frame start signal, wherein the driving control signals may include a third clock signal, a fourth clock signal, and a second frame start signal different from the first frame start signal, wherein a first gate stage among the plurality of gate stages may receive the first frame start signal, each of the plurality of gate stages may receive the first clock signal and the second clock signal, a first sense stage among the plurality of sense stages may receive the second frame start signal, and each of the plurality of sense stages may receive the third clock signal and the fourth clock signal.

In an exemplary embodiment, the driving control signals may further include a fifth clock signal, and each of the plurality of sense stages may receive the fifth clock signal.

In an exemplary embodiment, the display device may further include clock generation circuit configured to generate the fifth clock signal by gating the first clock signal and the second clock signal.

In an exemplary embodiment, the clock generation circuit may include an AND circuit, a NAND circuit, an XOR circuit, or an XNOR circuit.

In an exemplary embodiment, the plurality of gate stages and the plurality of sense stages may include different circuit structures.

In an exemplary embodiment, each of the plurality of driving electrodes may extend in a first direction, the plurality of driving electrodes may be arranged in a second direction crossing the first direction, each of the plurality of sensing electrodes may extend in the second direction, and the plurality of sensing electrodes may be arranged in the first direction, wherein each of the plurality of gate lines may extend in the second direction, the plurality of gate lines may be arranged in the first direction, each of the plurality of data lines may extend in the first direction, and the plurality of data lines may be arranged in the second direction.

In an exemplary embodiment of the inventive concept, a display device includes: a base film; a circuit layer disposed on the base film, the circuit layer including a gate driving unit that includes a plurality of gate stages and a sense driving unit that includes a plurality of sense stages; a light-emitting element layer disposed on the circuit layer; a thin-film encapsulation layer covering the light-emitting element layer; and a sensing unit disposed on the thin-film encapsulation layer, the sensing unit including a plurality of driving electrodes configured to receive a sense driving signal from the sense driving unit and a plurality of sensing electrodes.

In an exemplary embodiment, a first sense stage among the plurality of sense stages may receive a signal output from an nth gate stage among the plurality of gate stages.

In an exemplary embodiment, the circuit layer may further include at least one dummy stage connected between an nth gate stage (where n is a positive integer) among the plurality of gate stages and a first sense stage among the plurality of sense stages, wherein the first sense stage among the plurality of sense stages may receive a signal output from the dummy stage.

In an exemplary embodiment, the plurality of gate stages may receive a first clock signal and a second clock signal, and the plurality of sense stages may receive a third clock signal and a fourth clock signal.

In an exemplary embodiment, the plurality of sense stages may further receive a fifth clock signal generated by gating the first clock signal and the second clock signal.

Additional features of the inventive concepts will be set forth in the description which follows, and in part will be apparent from the description, or may be learned by practice of the inventive concepts.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate exemplary embodiments of the invention, and together with the description serve to explain the inventive concepts.

DETAILED DESCRIPTION

Figure 1A:
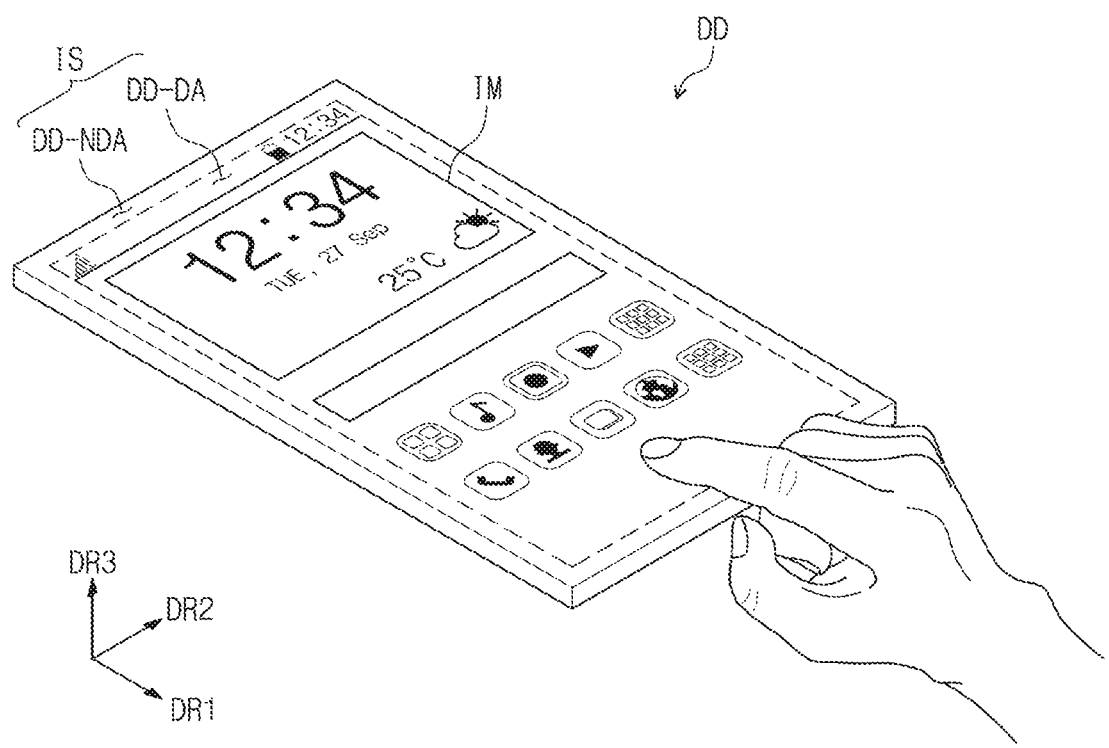
FIG. 1A is a perspective view of a display device according to an exemplary embodiment of the inventive concept.

In the following description, for the purposes of explanation, numerous specific details are set forth in order to provide a thorough understanding of various exemplary embodiments or implementations of the invention. As used herein "embodiments" and "implementations" are interchangeable words that are non-limiting examples of devices or methods employing one or more of the inventive concepts disclosed herein. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments. Further, various exemplary embodiments may be different, but do not have to be exclusive. For example, specific shapes, configurations, and characteristics of an exemplary embodiment may be used or implemented in another exemplary embodiment without departing from the inventive concepts.

Unless otherwise specified, the illustrated exemplary embodiments are to be understood as providing exemplary features of varying detail of some ways in which the inventive concepts may be implemented in practice. Therefore, unless otherwise specified, the features, components, modules, layers, films, panels, regions, and/or aspects, etc. (hereinafter individually or collectively referred to as "elements"), of the various embodiments may be otherwise combined, separated, interchanged, and/or rearranged without departing from the inventive concepts.

The use of cross-hatching and/or shading in the accompanying drawings is generally provided to clarify boundaries between adjacent elements. As such, neither the presence nor the absence of cross-hatching or shading conveys or indicates any preference or requirement for particular materials, material properties, dimensions, proportions, commonalities between illustrated elements, and/or any other characteristic, attribute, property, etc., of the elements, unless specified. Further, in the accompanying drawings, the size and relative sizes of elements may be exaggerated for clarity and/or descriptive purposes. When an exemplary embodiment may be implemented differently, a specific process order may be performed differently from the described order. For example, two consecutively described processes may be performed substantially at the same time or performed in an order opposite to the described order. Also, like reference numerals denote like elements.

When an element, such as a layer, is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. To this end, the term "connected" may refer to physical, electrical, and/or fluid connection, with or without intervening elements. Further, the D1-axis, the D2-axis, and the D3-axis are not limited to three axes of a rectangular coordinate system, such as the x, y, and z-axes, and may be interpreted in a broader sense. For example, the D1-axis, the D2-axis, and the D3-axis may be perpendicular to one another, or may represent different directions that are not perpendicular to one another. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. As used herein, the term "and/or" includes any and all combinations of one or more of the associated listed items.

Although the terms "first," "second," etc. may be used herein to describe various types of elements, these elements should not be limited by these terms. These terms are used to distinguish one element from another element. Thus, a first element discussed below could be termed a second element without departing from the teachings of the disclosure.

Spatially relative terms, such as "beneath," "below," "under," "lower," "above," "upper," "over," "higher," "side" (e.g., as in "sidewall"), and the like, may be used herein for descriptive purposes, and, thereby, to describe one elements relationship to another element(s) as illustrated in the drawings. Spatially relative terms are intended to encompass different orientations of an apparatus in use, operation, and/or manufacture in addition to the orientation is depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof. It is also noted that, as used herein, the terms "substantially," "about," and other similar terms, are used as terms of approximation and not as terms of degree, and, as such, are utilized to account for inherent deviations in measured, calculated, and/or provided values that would be recognized by one of ordinary skill in the art.

Various exemplary embodiments are described herein with reference to sectional and/or exploded illustrations that are schematic illustrations of idealized exemplary embodiments and/or intermediate structures. As such, variations from the shapes of the illustrations as a result, for example, of manufacturing techniques and/or tolerances, are to be expected. Thus, exemplary embodiments disclosed herein should not necessarily be construed as limited to the particular illustrated shapes of regions, but are to include deviations in shapes that result from, for instance, manufacturing. In this manner, regions illustrated in the drawings may be schematic in nature and the shapes of these regions may not reflect actual shapes of regions of a device and, as such, are not necessarily intended to be limiting.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and should not be interpreted in an idealized or overly formal sense, unless expressly so defined herein.

FIG. 1A is a perspective view of a display device according to an exemplary embodiment of the inventive concept.

Referring to FIG. 1A, a display device DD may display an image IM through a display surface IS. FIG. 1A exemplarily illustrates that the display surface IS has a surface defined by a first direction DR1 and a second direction DR2 crossing the first direction DR1.

However, another exemplary embodiment of the inventive concept, a display surface (not shown) of a display device (not shown) may have a curved shape.

A normal direction of the display surface IS, i.e., a thickness direction of the display device DD, is indicated by a third direction DR3. However, the directions indicated by the first to third directions DR1 to DR3 are relative concept and thus may be changed to other directions. Hereinafter, first to third directions which are indicated by the first to third directions DR1 to DR3 referred to by the same reference symbols.

FIG. 1A exemplarily illustrates a mobile electronic device in which the display device DD is used. However, the display device DD may be used not only in large-size is electronic devices such as a television, a monitor, or an outdoor billboard but also in small-size and medium-size electronic devices such as a personal computer, a laptop computer, a personal digital assistant, a vehicle navigation unit, a game machine, a smartphone, a tablet, and a camera. These devices are merely examples, and thus the display device may be applied to other electronic devices without departing from the inventive concept.

The display surface IS includes a display region DD-DA in which the image IM is displayed and a non-display region DD-NDA adjacent to the display region DD-DA. An image is not displayed in the non-display region DD-NDA. FIG. 1A illustrates application icons as an example of the image IM. For example, the display region DD-DA may be rectangular. The non-display region DD-NDA may surround the display region DD-DA. However, an exemplary embodiment of the inventive concept is not limited thereto, and thus a shape of the display region DD-DA and a shape of the non-display region DD-NDA may be relatively designed.

Figure 1B:
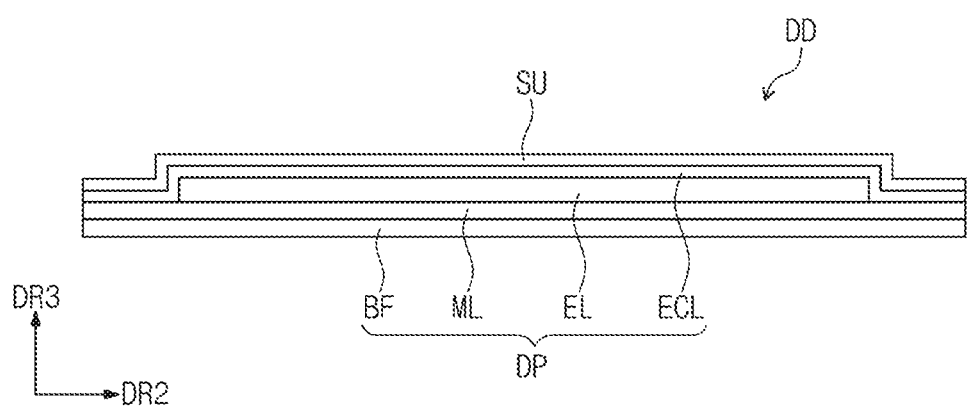
FIG. 1B is a schematic cross-sectional view of a display device according to an exemplary embodiment of the inventive concept.
Figure 2:
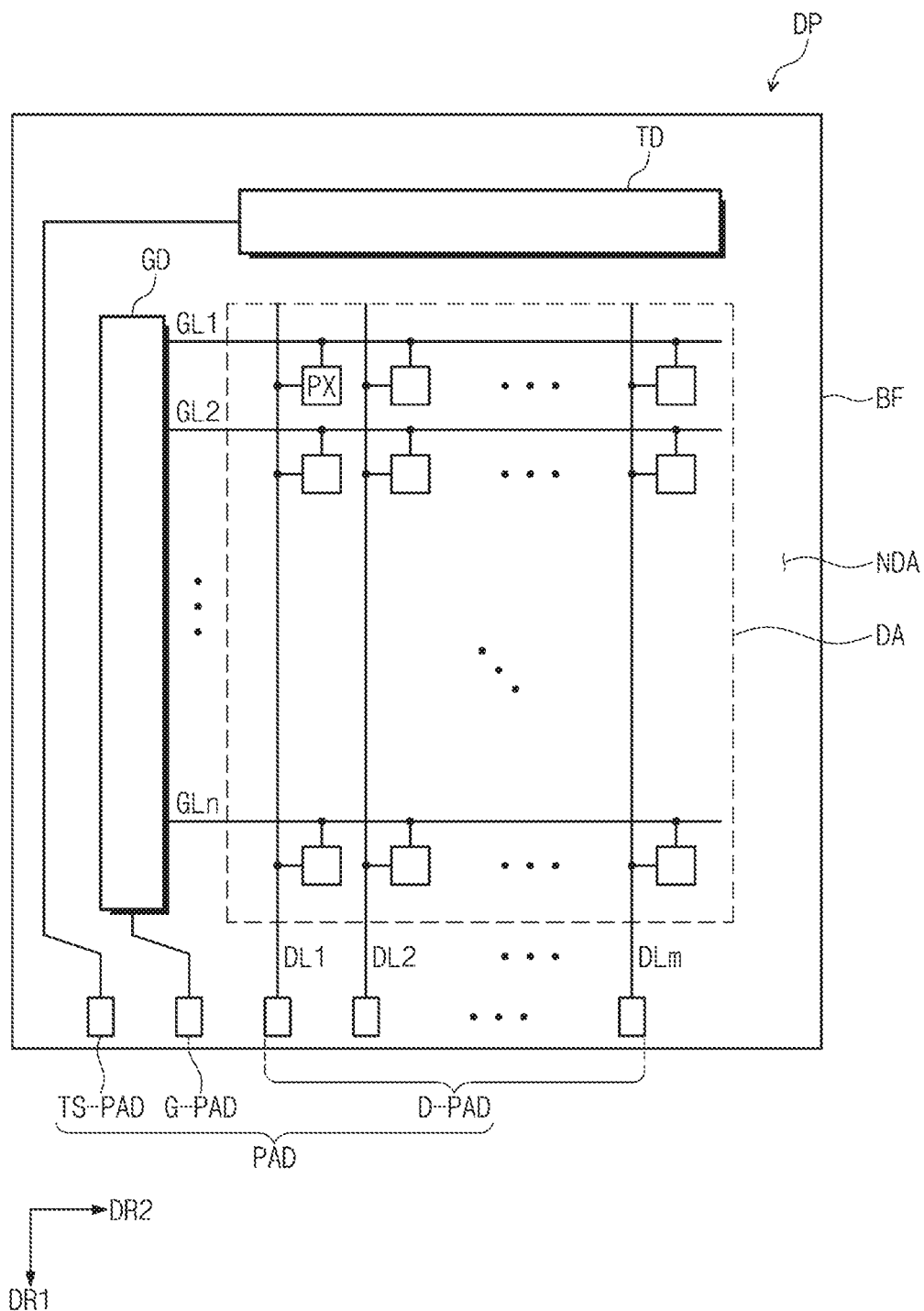
FIG. 2 is a plane view illustrating a partial configuration of a display panel according to an exemplary embodiment of the inventive concept.

FIG. 1B is a schematic cross-sectional view of a display device according to an exemplary embodiment of the inventive concept, and FIG. 2 is a plane view illustrating a partial configuration of a display panel according to an exemplary embodiment of the inventive concept.

Referring to FIGS. 1B and 2, the display device DD may include a display panel DP and a sensing unit SU.

The display panel DP includes a base film BF, a circuit layer ML, a light-emitting element layer EL, and a thin-film encapsulation layer ECL. In the present disclosure, an organic light-emitting display panel is described as an example of the display panel DP, but an exemplary embodiment of the inventive concept is not particularly limited thereto. For example, the display panel DP may be replaced with other types of display panels such as a liquid crystal display panel, an electro-phoretic display panel, an electro-wetting display panel, etc.

The base film BF may include a plastic substrate, a glass substrate, a metal substrate, an organic/inorganic composite substrate, etc. The plastic substrate may include at least one of acrylic resin, methacrylic resin, polyisoprene, vinyl-based resin, epoxy-based resin, urethane-based resin, cellulosic resin, siloxane resin, polyimide-based resin, polyamide-based resin, or perylene-based resin.

A display region DA and a non-display region NDA may be defined in the base film BF. The display region DA and the non-display region NDA of the base film BF may respectively correspond to the display region DD-DA (FIG. 1A) and the non-display region DD-NDA (FIG. 1A) of the display device DD (FIG. 1A). However, the display region DA and the non-display region NDA are not necessarily identical to the display region DD-DA (FIG. 1A) and the non-display region DD-NDA (FIG. 1A) of the display device DD (FIG. 1A), and may be modified according to a structure/design of the display panel DP.

The circuit layer ML may be disposed on the base film BF. The circuit layer ML may include a plurality of insulating layers, a plurality of conductive layers, and a semiconductor layer. The plurality of conductive layer of the circuit layer ML may constitute signal lines or an electrode of a transistor.

The circuit layer ML may include a plurality of data lines DL1 to DLm, a plurality of gate lines GL1 to GLn, a gate driving unit GD, a sense driving unit TD, and pads PAD. That is, the gate driving unit GD and the sense driving unit TD may be arranged in the same layer.

The plurality of data lines DL1 to DLm may extend in the first direction DR1 and may be arranged in the second direction DR2 crossing the first direction DR1. The plurality of gate lines GL1 to GLn may extend in the second direction DR2 and may be arranged in first direction DR1. The plurality of data lines DL1 to DLm and the plurality of gate lines GL1 to GLn may define pixel regions, each of which may be provided with a pixel PX for displaying an image.

The pixel PX may display one of primary colors or one of mixed colors. The primary colors may include red, green, and blue, and the mixed colors may include various colors such as white, yellow, cyan, magenta, etc. However, the colors displayed by the pixels PX are not limited thereto.

The gate driving unit GD may receive a gate control signal from an external driving circuit (not shown), and may provide, in response to this gate control signal, a gate signal to the plurality of gate lines GL1 to GLn. The gate control signal may be received through a pad G-PAD electrically connected to the gate driving unit GD, among the pads PAD.

The gate driving unit GD may be integrated in the non-display region NDA of the base film BF. In this case, the gate driving unit GD may be implemented as a circuit using an amorphous silicon gate (ASG) with an amorphous silicon thin film transistor (a-Si TFT), an oxide semiconductor, a crystalline semiconductor, a polycrystalline semiconductor, or the like.

Some pads D-PAD among the pads PAD may be connected to an end of each of the data lines DL1 to DLm. The pads D-PAD may receive an electric signal from an external driving circuit (not shown) and may transfer the electric signal to the data lines DL1 to DLm.

The sense driving unit TD may be integrated in the non-display region NDA of the base film BF. The sense driving unit TD may be integrated in a region spaced apart in the first direction DR1 from the display region DA. The sense driving unit TD may receive a driving control signal from an external driving circuit (not shown), and may provide a sense driving signal to the sensing unit SU. The driving control signal may be received through a pad TS-PAD electrically connected to the sense driving unit TD, among the pads PAD.

The sense driving unit TD may be formed during the same process as the gate driving unit GD. For example, the sense driving unit TD and the gate driving unit GD may be simultaneously formed through a low temperature polycrystalline silicon process or a low temperature polycrystalline oxide process.

The light-emitting element layer EL includes a display element, for example, organic light-emitting diodes. However, an exemplary embodiment of the inventive concept is not limited thereto, and thus the light-emitting element layer EL may include inorganic light-emitting diodes or organic-inorganic hybrid light-emitting diodes according to the type of the display panel DP.

The thin-film encapsulation layer ECL seals the light-emitting element layer EL. The thin-film encapsulation layer ECL includes a plurality of inorganic thin films and at least one organic thin film disposed therebetween. The inorganic thin films protect the light-emitting element layer EL from moisture and oxygen, and the organic thin film protects the light-emitting element layer EL from foreign matters such as dust particles.

The thin-film encapsulation layer ECL may further include a buffer layer. The buffer layer may be a layer which is most adjacent to the sensing unit SU. The buffer layer may be an organic layer or an inorganic layer. The inorganic layer may include at least one of silicon nitride, silicon oxynitride, silicon oxide, titanium oxide, or aluminum oxide. The organic layer may include a polymer, for example, acrylic organic layer. However, this is merely an example, and an embodiment of the inventive concept is not limited thereto.

The sensing unit SU may be directly disposed on the display panel DP. The term "directly dispose" excludes bonding by using an additional bonding member, and represents forming through a continuous process. However, an exemplary embodiment of the inventive concept is not limited thereto, and thus the display panel DP and the sensing unit SU may be coupled to each other using a bonding member (not shown). The sensing unit SU may be electrically connected to the sense driving unit TD, and a part of the sensing unit SU may receive a sense driving signal from the sense driving unit TD.

Figure 3:
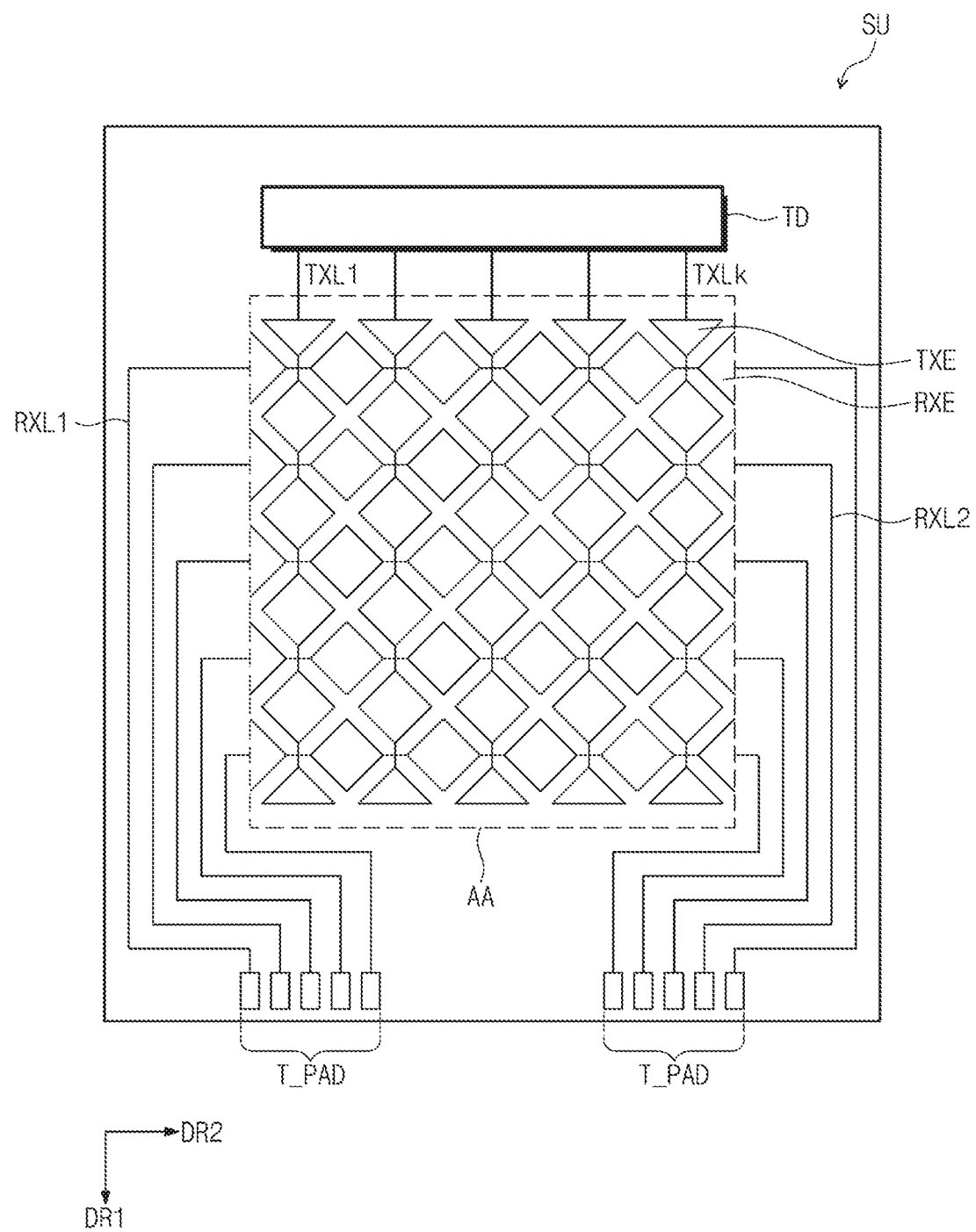
FIG. 3 is a plane view illustrating a partial configuration of a sensing unit according to an exemplary embodiment of the inventive concept.

FIG. 3 is a plane view illustrating a part of the sensing unit SU according to an exemplary embodiment of the inventive concept.

Referring to FIG. 3, the sensing unit SU may include a plurality of driving electrodes TXE, a plurality of sensing electrodes RXE, the sense driving unit TD, wirings RXL1 and RXL2, and sensing pads T_PAD. As described above, the sense driving unit TD may be disposed in the circuit layer ML (see FIG. 1B) of the display panel DP (see FIG. 1B).

A region in which the plurality of driving electrodes TXE and the plurality of sensing electrodes RXE are arranged to sense an external touch may be defined as an active region AA. The active region AA may correspond to the display region DA described above with reference to FIG. 2. However, the active region AA is not necessarily identical to the display region DA, and may be wider or narrower than the display region DA.

Each of the plurality of driving electrodes TXE may extend in the first direction DR1, and the plurality of driving electrodes TXE may be arranged in the second direction DR2. Each of the plurality of sensing electrodes RXE may extend in the second direction DR2, and the plurality of sensing electrodes RXE may be arranged in the first direction DR1.

Each of the plurality of driving electrodes TXE may be electrically connected to the sense driving unit TD via driving lines TXL1 to TXLk. The sense driving unit TD may receive driving control signals from an external driving circuit (not shown), and may provide a sense driving signal to the plurality of driving electrodes TXE.

Each of the plurality of sensing electrodes RXE may be electrically connected to the sensing pads T_PAD via the wirings RXL1 and RXL2. The wirings RXL1 and RXL2 may be divided into first wirings RXL1 arranged at one side of the active region AA and second wiring RXL2 arranged at another side of the active region AA.

In FIG. 3, each of the first wirings RXL1 and the second wirings RXL2 may be connected to each of the plurality of sensing electrodes RXE. That is, one end of one sensing electrode among the plurality of sensing electrodes RXE may be connected to the first wiring and the other end of the one sensing electrode may be connected to the second wiring.

The plurality of sensing electrodes RXE and the plurality of driving electrodes TXE may form a mutual capacitance to sense a touch applied externally. The plurality of sensing electrodes RXE may output, to the sensing pads T_PAD connected to the first and second wirings RXL1 and RXL2, an electric signal corresponding to a change of the mutual capacitance after the touch is applied.

The sensing pads T_PAD may be electrically connected to a touch IC (not shown) provided at an outer side of the sensing unit SU. The touch IC may receive a sense signal via the sensing pads T_PAD.

According to an exemplary embodiment of the inventive concept, the sense driving unit TD which provides a driving signal to be applied to the plurality of driving electrodes TXE is separately provided from the touch IC connected to the sensing pads T_PAD. Therefore, it may not be necessary to provide pads for externally receiving a signal to be applied to the driving electrodes TXE and wirings for connecting the pads and the driving electrodes TXE. Accordingly, wirings arranged at an outer periphery of the active region AA may be simplified. Since the wirings arranged at the outer periphery of the active region AA is simplified, a margin of wiring arrangement design may be improved, and an area of the outer periphery may be reduced.

Figure 4:
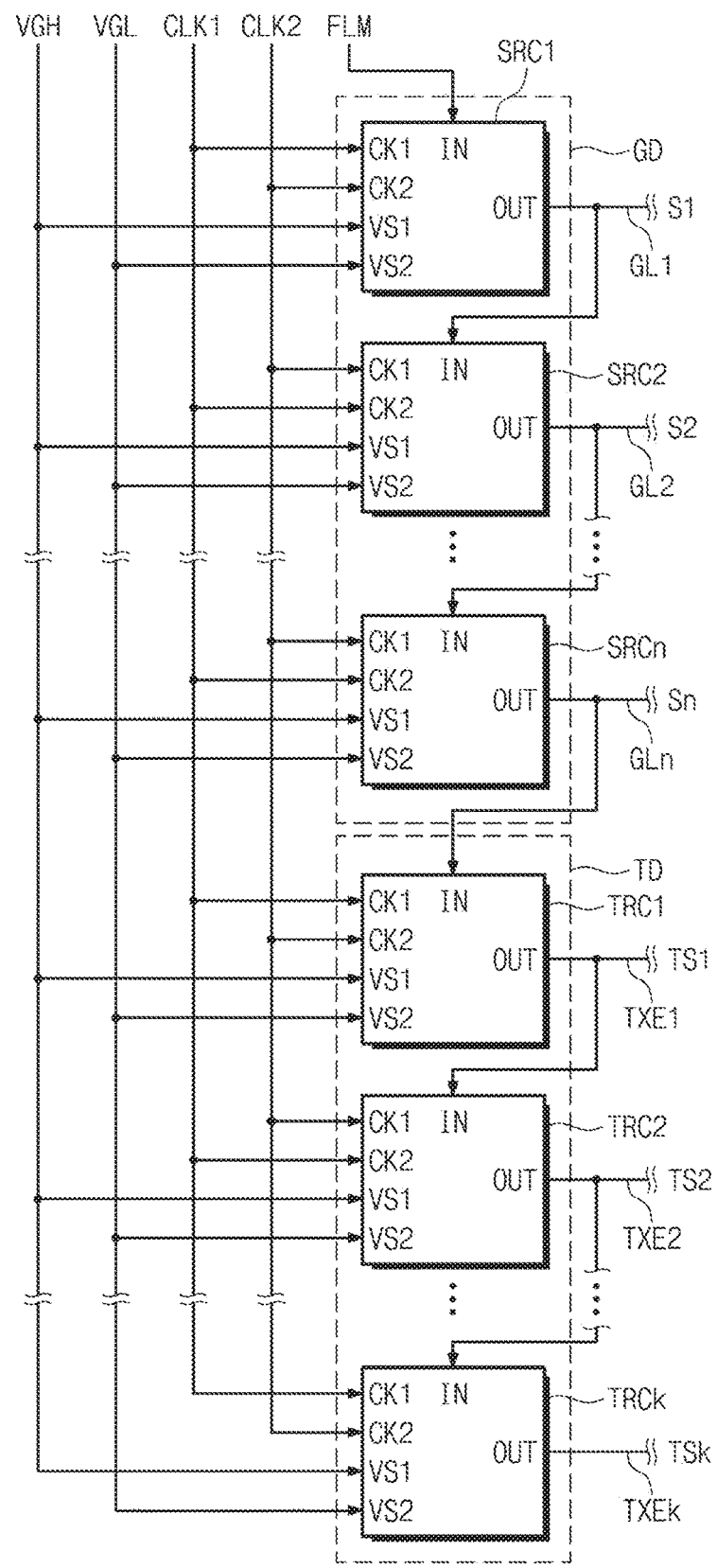
FIG. 4 is a block diagram illustrating a gate driving unit and a sense driving unit according to an exemplary embodiment of the inventive concept.
Figure 5:
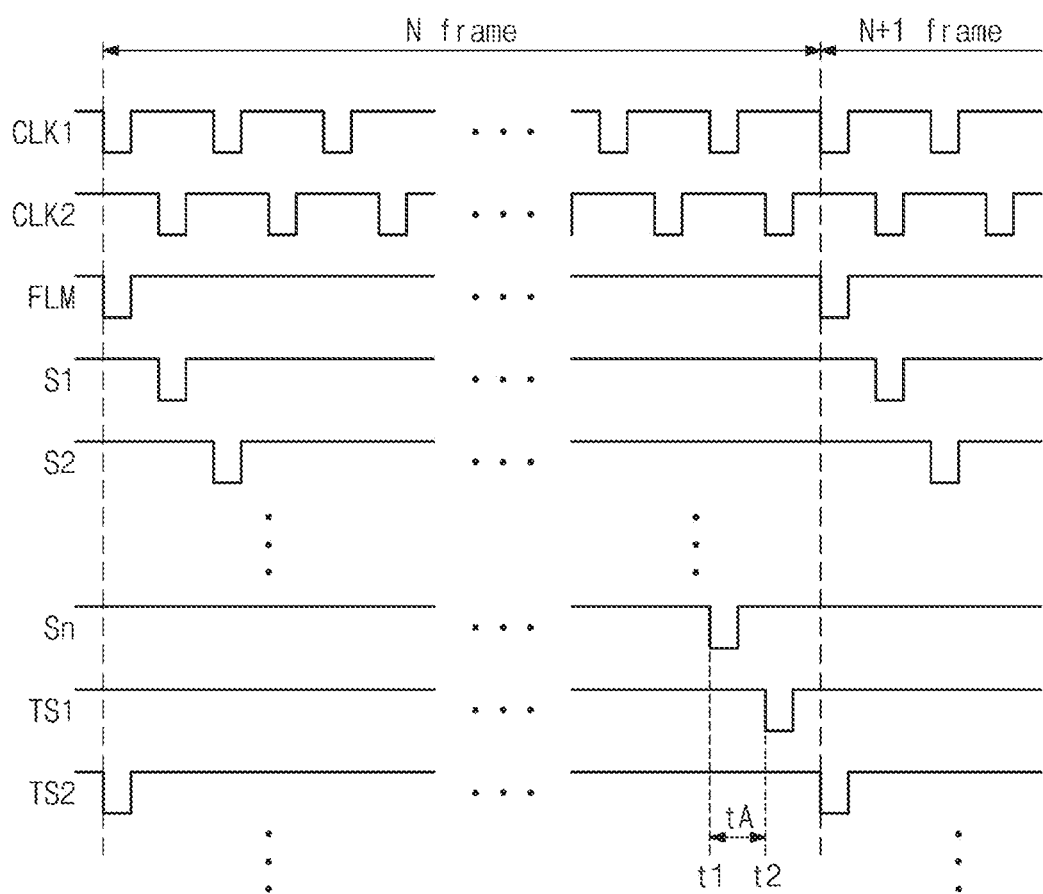
FIG. 5 is a timing diagram illustrating some of signals generated in a display device according to an exemplary embodiment of the inventive concept.

FIG. 4 is a block diagram illustrating the gate driving unit GD and the sense driving unit TD according to an exemplary embodiment of the inventive concept, and FIG. 5 is a timing diagram illustrating some of signals generated in a display device according to an exemplary embodiment of the inventive concept.

Referring to FIGS. 4 and 5, the gate driving unit GD may include a plurality of gate stages SRC1 to SRCn, and the sense driving unit TD may include a plurality of sense stages TRC1 to TRCk. In the present exemplary embodiment, the gate stages SRC1 to SRCn and the sense stages TRC1 to TRCk may include the same circuit structure.

The gate driving unit GD may receive gate control signals, and the sense driving unit TD may receive driving control signals. In an exemplary embodiment of the inventive concept, the gate control signals may include a first clock signal CLK1, a second clock signal CLK2, and a frame start signal FLM, and the driving control signals may include the first clock signal CLK1 and the second clock signal CLK2.

The gate stages SRC1 to SRCn may be one-to-one connected to the corresponding gate lines GL1 to GLn, and the sense stages TRC1 to TRCk may be one-to-one connected to the corresponding driving electrodes TXE1 to TXEk. Gate signals S1 to Sn generated from the gate stages SRC1 to SRCn are provided to the plurality of gate lines GL1 to GLn via an output terminal OUT, and sense driving signals TS1 to TSk generated from the sense stages TRC1 to TRCk are provided to the plurality of driving electrodes TXE1 to TXEk via an output terminal OUT.

Each of the gate stages SRC1 to SRCn and the sense stages TRC1 to TRCk includes an input terminal IN, an output terminal OUT, first and second clock terminals CK1 and CK2, a first voltage terminal VS1, and a second voltage terminal VS2.

The input terminal IN of each of the gate stages SRC1 to SRCn and the sense stages TRC1 to TRCk may receive an output signal of a previous stage. The output signal may be, for example, the gate signals Si to Sn or the sense driving signals TS1 to TSk. That is, each of the gate stages SRC1 to SRCn and the sense stages TRC1 to TRCk may have a dependent connection relationship to operate in response to a signal output from a previous stage. However, the input terminal IN of the first gate stage SRC1 that does not have a previous stage may receive the frame start signal FLM. The frame start signal FLM, which initiates driving of the gate driving unit GD, may transition to a low level every time each frame, i.e., N frame or N+1 frame, starts.

The output terminal OUT of each of the gate stages SRC1 to SRCn and the sense stages TRC1 to TRCk is connected to the input terminal IN of a next stage. However, the output terminal OUT of the nth gate stage SRCn among the gate stages SRC1 to SRCn may be connected to the input terminal IN of the first sense stage TRC1 among the sense stages TRC1 to TRCk. That is, the plurality of gate stages SRC1 to SRCn and the plurality of sense stages TRC1 to TRCk may be electrically connected to each other.

Since the input terminal IN of the first sense stage TRC1 is dependently connected to the output terminal of the nth gate stage SRCn, a level of the first sense driving signal TS1 may be changed after elapse of a predetermined time to after a point of time t1 at which a level of the nth gate signal Sn is changed.

Odd numbered stages among the gate stages SRC1 to SRCn and the sense stages is TRC1 to TRCk may receive the first clock signal CLK1 through the first clock terminal CK1, and even numbered stages may receive the second clock signal CLK2 through the first clock terminal CK1. Furthermore, the odd numbered stages may receive the second clock signal CLK2 through the second clock terminal CK2, and the even numbered stages may receive the first clock signal CLK1 through the second clock terminal CK2. The first clock signal CLK1 and the second clock signal CLK2 may have different phases.

Each of the gate stages SRC1 to SRCn and the sense stages TRC1 to TRCk may receive a first voltage VGH through the first voltage terminal VS1 and may receive a second voltage VGL through the second voltage terminal VS2. The first voltage VGH and the second voltage VGL may have different voltage levels, and the second voltage VGL may have a lower level than that of the first voltage VGH. For example, the first voltage VGH may be a high-level gate-off voltage, and the second voltage VGL may be a low-level gate-on voltage.

Figure 6:
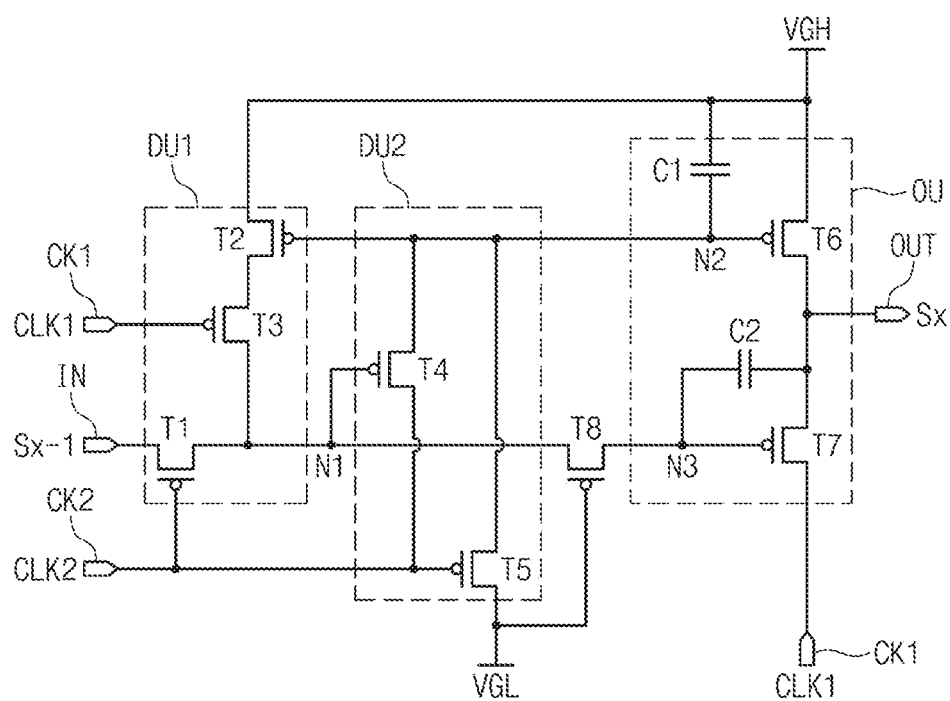
FIG. 6 is an equivalent circuit diagram illustrating a plurality of gate stages and a plurality of sense stages according to an exemplary embodiment of the inventive concept.

FIG. 6 is an equivalent circuit diagram illustrating the plurality of gate stages SRC1 to SRCn and the plurality of sense stages TRC1 to TRCk according to an exemplary embodiment of the inventive concept.

Referring to FIGS. 4 to 6, the gate stages SRC1 to SRCn and the sense stages TRC1 to TRCk include the same circuit structure. Therefore, FIG. 6 only illustrates an equivalent circuit of an xth gate stage.

The xth gate stage may include a first driving unit DU1, a second driving unit DU2, an output unit OU, and an eighth transistor T8. However, a configuration of the xth gate stage is not limited thereto, and thus may be modified.

The first driving unit DU1 controls a voltage of a first node N1 in response to signals supplied to the first input terminal IN and the first and second clock terminals CK1 and is CK2. The first driving unit DU1 may include first to third transistors T1 to T3.

A first electrode of the first transistor T1 is connected to the input terminal IN, a second electrode is connected to the first node N1, and a control electrode is connected to the second clock terminal CK2. The first transistor T1 may control a connection between the input terminal IN and the first node N1 in response to a signal supplied to the second clock terminal CK2.

The second transistor T2 and the third transistor T3 are connected in series between the first node N1 and the first voltage VGH.

A control electrode of the second transistor T2 is connected to a second node N2. The second transistor T2 may control a connection between the third transistor T3 and the first voltage VGH in response to a voltage of the second node N2.

A control electrode of the third transistor T3 may be connected to the first clock terminal CK1. The third transistor T3 may control a connection between the second transistor T2 and the first node N1 in response to a signal supplied to the first clock terminal CK1.

The second driving unit DU2 controls the voltage of the second node N2 in response to the signal supplied to the second clock terminal CK2 and the voltage of the first node N1. The second driving unit DU2 may include a fourth transistor T4 and a fifth transistor T5.

A first electrode of the fourth transistor T4 may be connected to the second node N2, a second electrode may be connected to the second clock terminal CK2, and a control electrode may be connected to the first node N1. The fourth transistor T4 may control a connection between the second node N2 and the second clock terminal CK2 in response to the voltage of the first node N1.

A first electrode of the fifth transistor T5 may be connected to the second node N2, a second electrode may be connected to the second voltage VGL, and a control electrode may be connected to the second clock terminal CK2. The fifth transistor T5 may control a connection between the second node N2 and the second voltage VGL in response to the signal of the second clock terminal CK2.

The output terminal OU may control a voltage supplied to the output terminal OUT in response to voltages supplied to the second node N2 and a third node N3. The output unit OU may include sixth and seventh transistors T6 and T7 and first and second capacitors C1 and C2.

A first electrode of the sixth transistor T6 may be connected to the first voltage VGH, a second electrode may be connected to the output terminal OUT, and a control electrode may be connected to the second node N2. The sixth transistor T6 may control a connection between the first voltage VGH and the output terminal OUT in response to the voltage applied to the second node N2.

A first electrode of the seventh transistor T7 may be connected to the output terminal OUT, a second electrode may be connected to the first clock terminal CK1, and a control electrode may be connected to the third node N3. The seventh transistor T7 may control a connection between the output terminal OUT and the first clock terminal CK1 in response to the voltage applied to the third node N3.

The first capacitor C1 may be connected between the second node N2 and the first voltage VGH, and the second capacitor C2 may be connected between the output terminal OUT and the third node N3. The first capacitor C1 may charge the voltage applied to the second node N2, and the second capacitor C2 may charge a voltage corresponding to turning on or turning off of the seventh transistor T7.

A first electrode of the eighth transistor T8 may be connected to the first node N1, a second electrode may be connected to the third node N3, and a control electrode may be connected to the second voltage VGL. The eighth transistor T8 may electrically connect the first node N1 and the third node N3 while maintaining a turned-on state.

Figure 7:
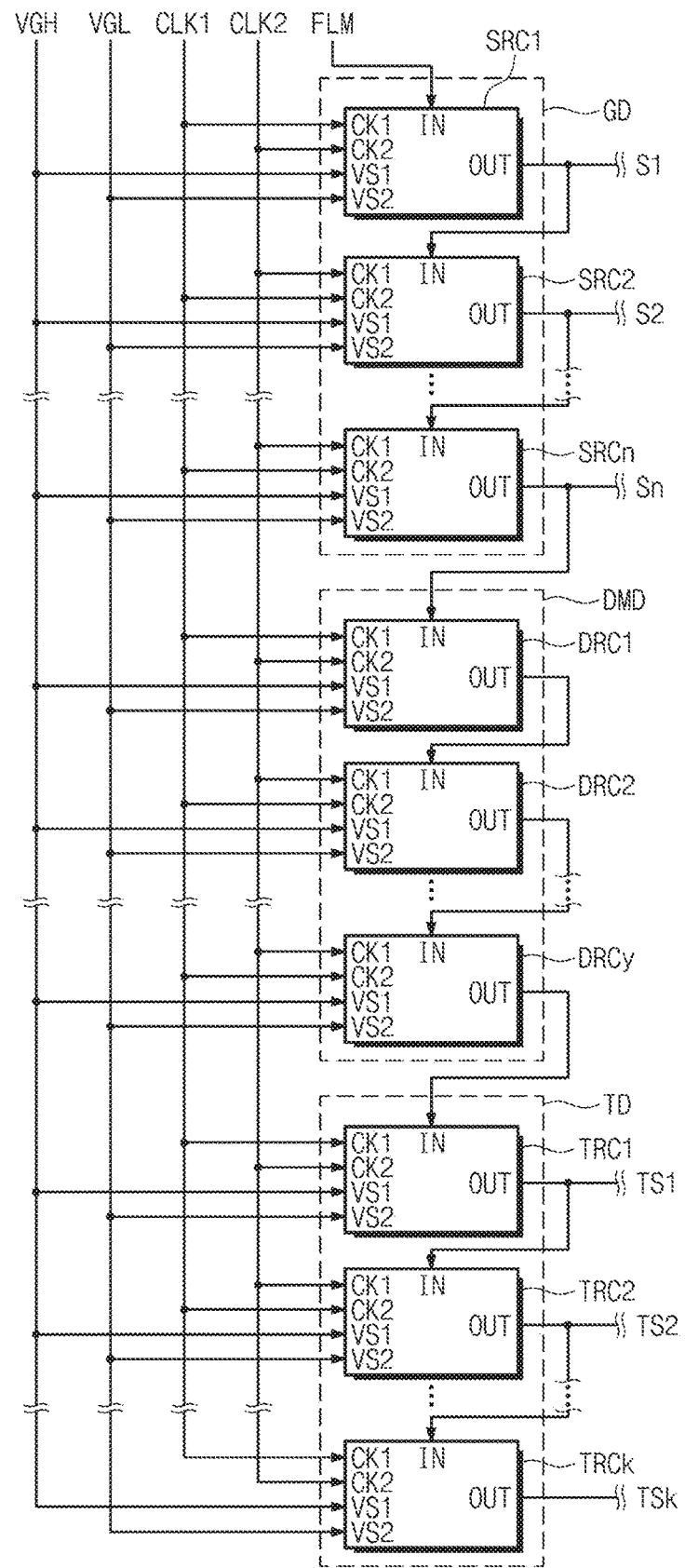
FIG. 7 is a block diagram illustrating a gate driving unit, a dummy unit, and a sense driving unit according to an exemplary embodiment of the inventive concept.

FIG. 7 is a block diagram illustrating the gate driving unit, a dummy unit DMD, and the sense driving unit TD according to an exemplary embodiment of the inventive concept. The elements described above with reference to FIG. 4 are referred to by the same reference symbols in FIG. 7, and are not described in detail below.

Referring to FIG. 7, the circuit layer ML (see FIG. 1B) may further include the dummy unit DMD. The dummy unit DMD may be electrically connected to the gate driving unit GD and the sense driving unit TD. In particular, the dummy unit DMD may be connected to the nth gate stage SRCn and the first sense stage TRC1.

The dummy unit DMD may include one or more dummy stages DRC1 to DRCy. Each of the dummy stages DRC1 to DRCy may have the same equivalent circuit as illustrated in FIG. 6.

The first dummy stage DRC1 may receive an output signal of the nth gate stage SRCn through the input terminal IN of the first dummy stage DRC1, and the yth dummy stage DRCy may output an output signal to the input terminal IN of the first sense stage TRC1.

The time to between the point of time t1 (see FIG. 5) at which the level of the nth gate signal Sn is changed and the point of time t2 (see FIG. 5) at which the level of the first sense driving signal TS1 is changed may be adjusted by adjusting the number of the dummy stages DRC1 to DRCy.

Figure 8:
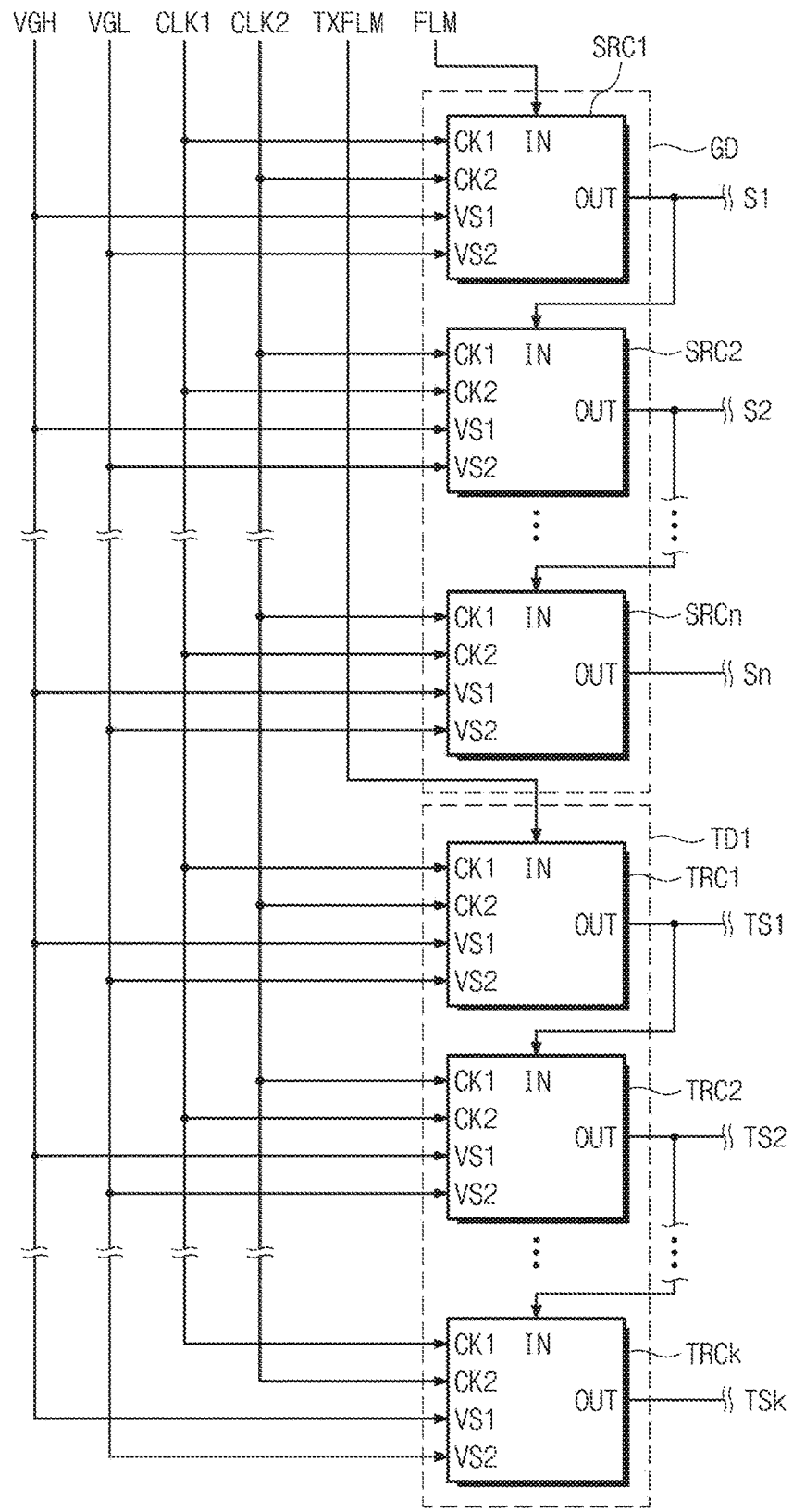
FIG. 8 is a block diagram illustrating a gate driving unit and a sense driving unit according to an exemplary embodiment of the inventive concept.
Figure 9:
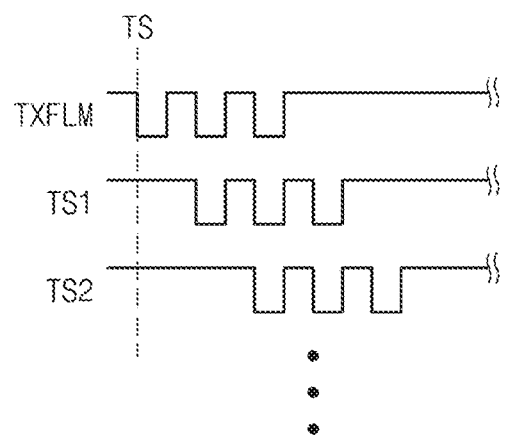
FIG. 9 is a timing diagram illustrating some of signals generated in a display device according to an exemplary embodiment of the inventive concept.

FIG. 8 is a block diagram illustrating the gate driving unit GD and a sense driving is unit TD1 according to an exemplary embodiment of the inventive concept, and FIG. 9 is a timing diagram illustrating some of signals generated in a display device according to an exemplary embodiment of the inventive concept. The elements described above with reference to FIG. 4 are referred to by the same reference symbols in FIG. 8, and are not described in detail below.

Referring to FIGS. 8 and 9, the driving control signals may further include a sense start signal TXFLM. The sense start signal TXFLM, which initiates driving of the sense driving unit TD1, may transition to a low level at a point of time TS at which the driving is initiated.

According to the exemplary embodiment of FIG. 8, the gate driving unit GD and the sense driving unit TD1 may only share the first and second clock signals CLK1 and CLK2. Therefore, the sense driving unit TD1 may be driven at a driving timing independent of the gate driving unit GD. For example, when the display panel DP (see FIG. 1B) is driven at a predetermined frequency (e.g., 60 Hz), the sensing unit SU (see FIG. 1B), regardless of this frequency, may be controlled according to a frequency of the sense start signal TXFLM. Furthermore, waveforms of the sense driving signals TS1 to TSk may be adjusted by adjusting a waveform of the sense start signal TXFLM. The sense start signal TXFLM may be a signal which toggles between certain levels during a predetermined period. The sense driving signals TS1 to TSk may also toggle between certain levels in response to the sense start signal TXFLM.

Figure 10:
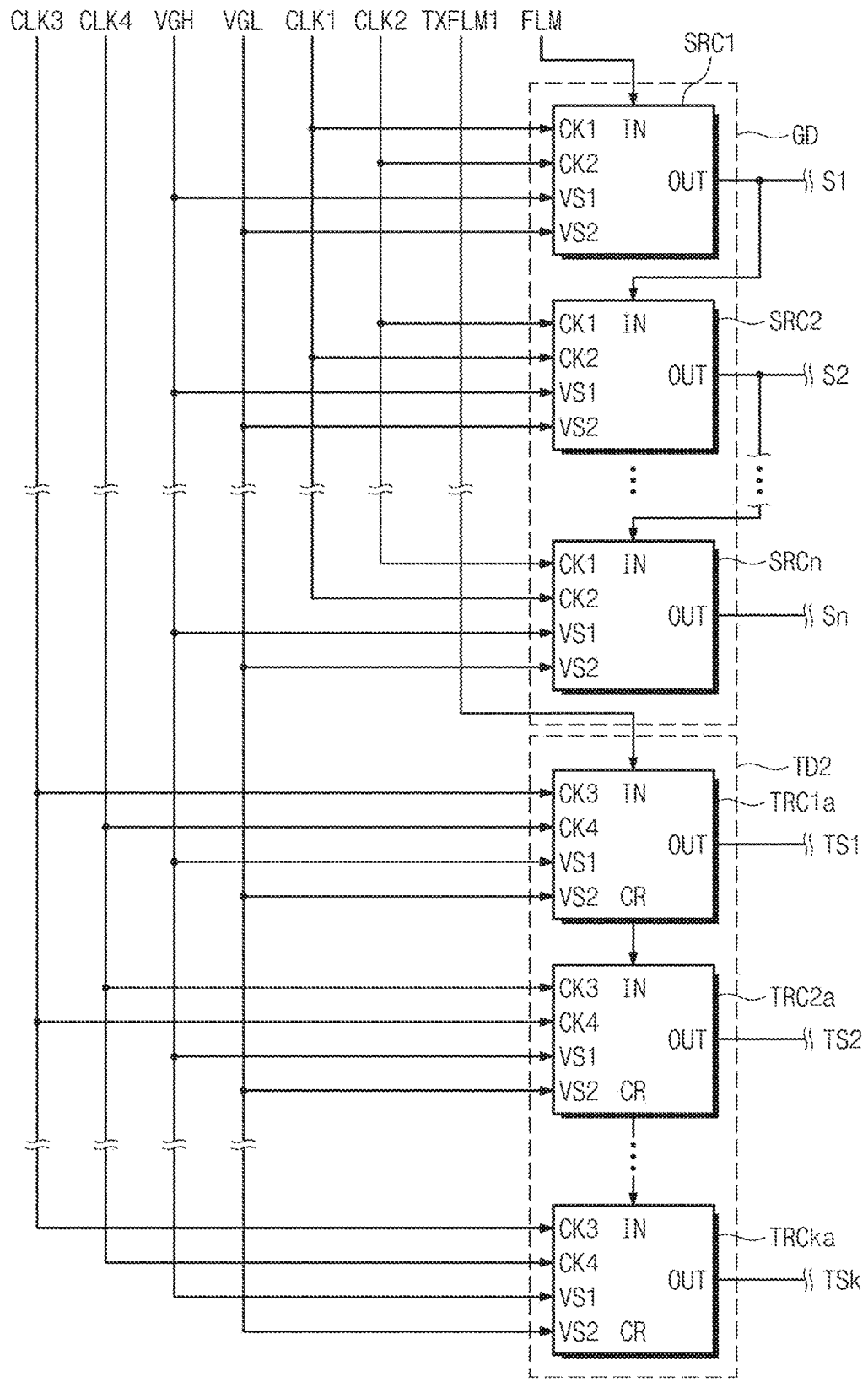
FIG. 10 is a block diagram illustrating a gate driving unit and a sense driving unit according to an exemplary embodiment of the inventive concept.
Figure 11:
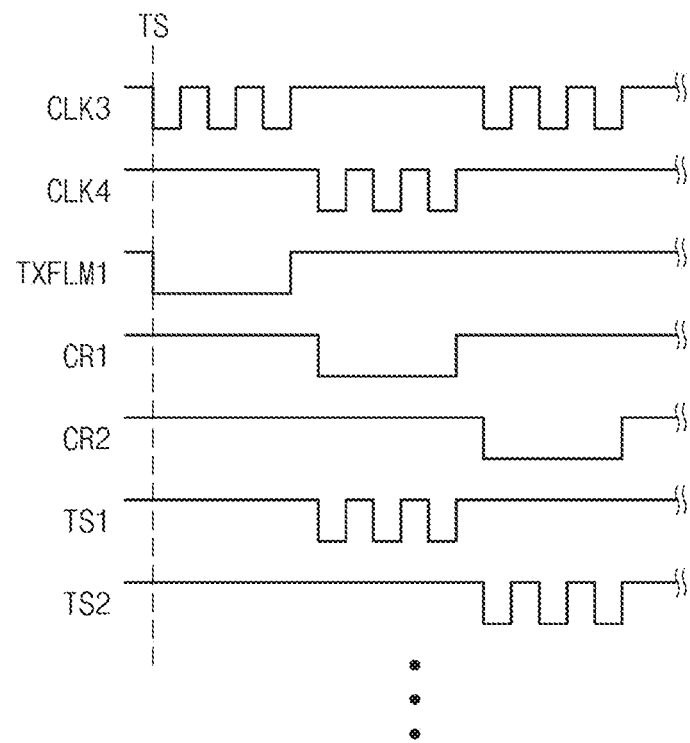
FIG. 11 is a timing diagram illustrating some of signals generated in a display device according to an exemplary embodiment of the inventive concept.
Figure 12:
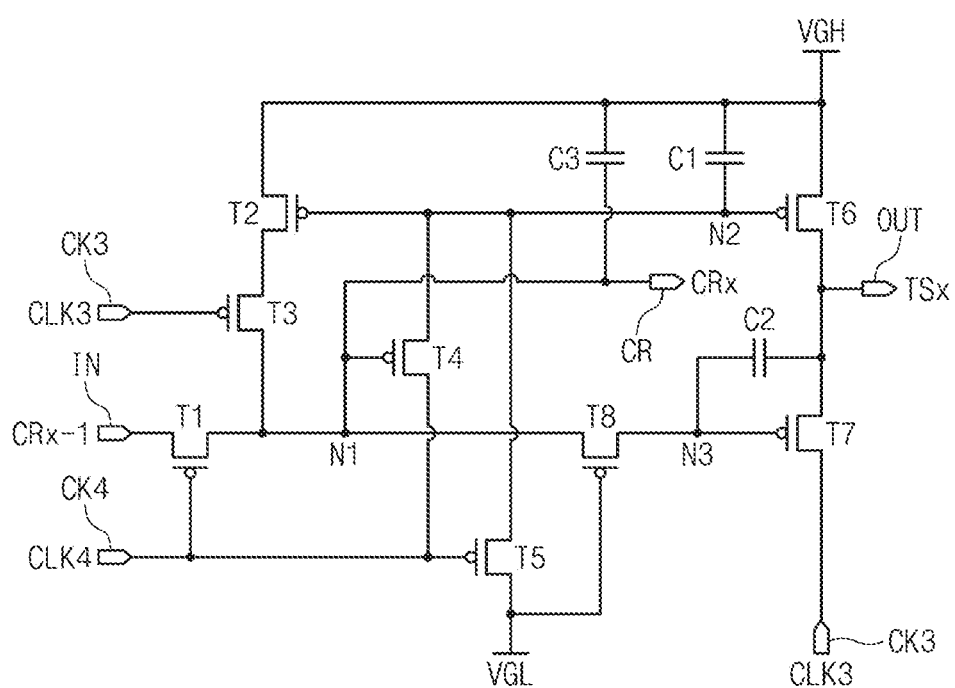
FIG. 12 is an equivalent circuit diagram illustrating the plurality of sense stages illustrated in FIG. 10.

FIG. 10 is a block diagram illustrating the gate driving unit GD and a sense driving unit TD2 according to an exemplary embodiment of the inventive concept, FIG. 11 is a timing diagram illustrating some of signals generated in a display device according to an exemplary embodiment of the inventive concept, and FIG. 12 is an equivalent circuit diagram illustrating the plurality of sense stages TRC1a to TRCka illustrated in FIG. 10. The elements described above with reference to FIGS. 4 to 6 are referred to by the same reference symbols in is FIGS. 10 to 12, and are not described in detail below.

Referring to FIGS. 10 to 12, the gate control signals may include the first clock signal CLK1, the second clock signal CLK2, and a first frame start signal FLM, and the driving control signals may include a third clock signal CLK3, a fourth clock signal CLK4, and a second frame start signal TXFLM1. The second frame start signal TXFLM1 may be a signal for initiating driving of the sense driving unit TD2.

Each of the sense stages TRC1a to TRCka includes an input terminal IN, an output terminal OUT, third and fourth clock terminals CK3 and CK4, a first voltage terminal VS1, a second voltage terminal VS2, and a carry terminal CR.

The input terminal IN of each of the sense stages TRC1a to TRCka may receive the carry signal of a previous stage.

Referring to FIG. 12, the input terminal IN of an xth sense stage may receive the carry signal CRx-1 of an (x-1)th sense stage. However, the input terminal IN of the first sense stage TRC1a may receive the second frame start signal TXFLM1. The second frame start signal TXFLM1 may have the same waveform as the carry signals CR1, CR2, CRx-1, and CRx. However, they may have different phases.

Odd numbered sense stages among the sense stages TRC1a to TRCka may receive the third clock signal CLK3 through the third clock terminal CK3, and even numbered sense stages may receive the fourth clock signal CLK4 through the third clock terminal CK3. Furthermore, the odd numbered sense stages may receive the fourth clock signal CLK4 through the fourth clock terminal CK4, and the even numbered sense stages may receive the third clock signal CLK3 through the fourth clock terminal CK4.

The third clock signal CLK3 and the fourth clock signal CLK4 may be signals which toggle between certain levels. The sense driving signals TS1 to TSk may also toggle is between certain levels in response to the third clock signal CLK3 and the fourth clock signal CLK4.

The gate stages SRC1 to SRCn and the sense stages TRC1a to TRCka may have different circuit structures. Each of the gate stages SRC1 to SRCn may have the equivalent circuit illustrated in FIG. 6, and each of the sense stages TRC1a to TRCka may have the equivalent circuit illustrated in FIG. 12.

Compared to the equivalent circuit illustrated in FIG. 6, the equivalent circuit illustrated in FIG. 12 may further include a carry terminal CR and a third capacitor C3. The third capacitor C3 may be connected between the first node N1 and the first voltage VGH to charge the voltage applied to the first node N1. The carry terminal CR may be connected to the first node N1 to output a carry signal CRx.

Since the sense driving unit TD2 receives the third clock signal CLK3, the fourth clock signal CLK4, and the second frame start signal TXFLM1, which are separate from those for the gate driving unit GD, the sense driving unit TD2 may be driven at a driving timing independent of the gate driving unit GD. Furthermore, waveforms of the sense driving signals TS1 to TSk may be adjusted by adjusting waveforms of the third clock signal CLK3 and the fourth clock signal CLK4.

Figure 13:
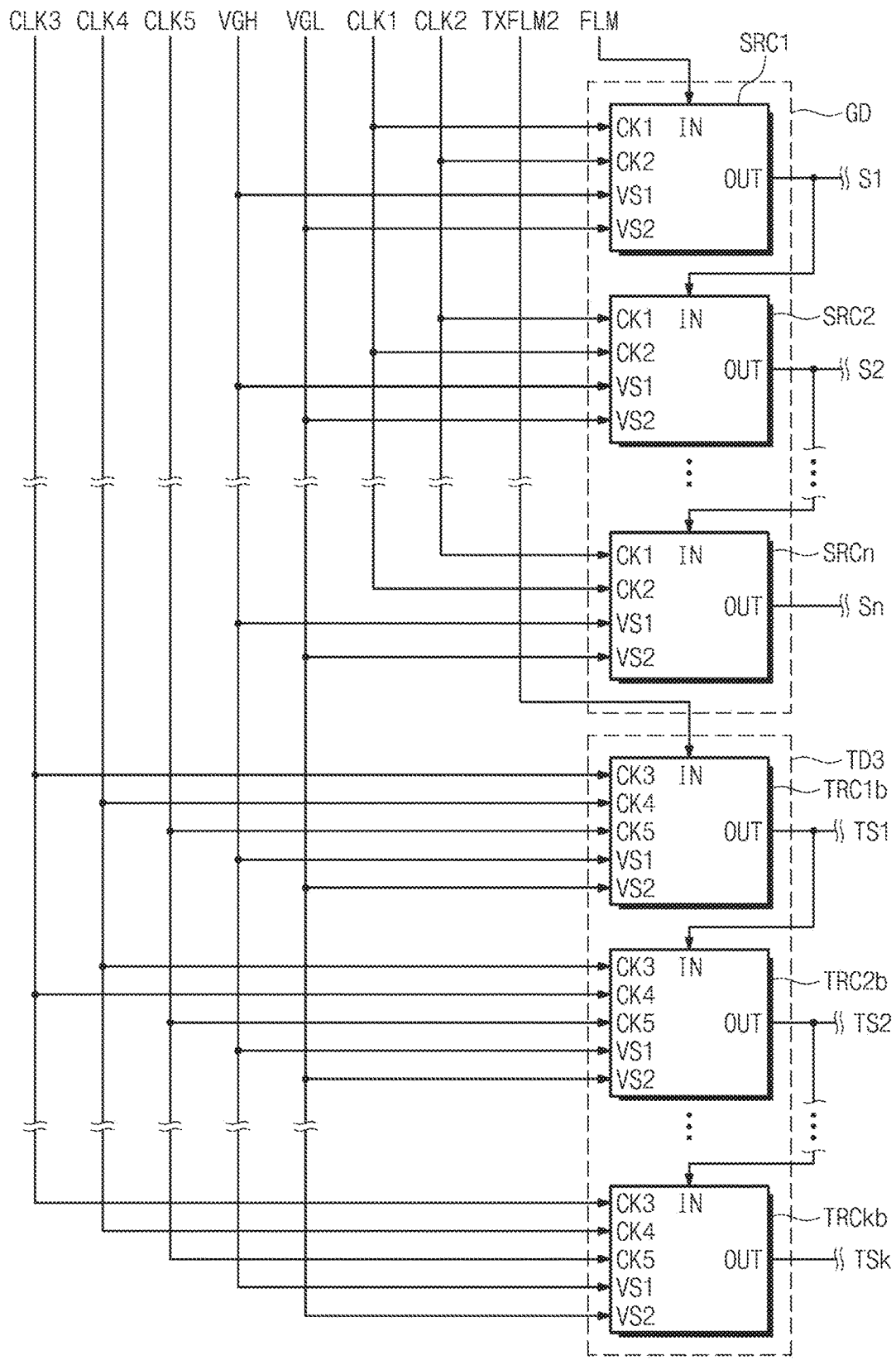
FIG. 13 is a block diagram illustrating a gate driving unit and a sense driving unit according to an exemplary embodiment of the inventive concept.
Figure 14:
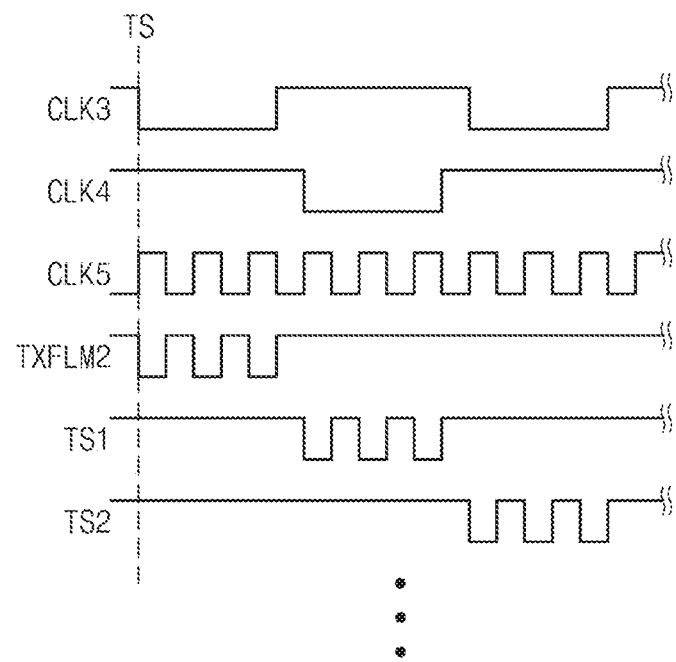
FIG. 14 is a timing diagram illustrating some of signals generated in a display device according to an exemplary embodiment of the inventive concept.
Figure 15:
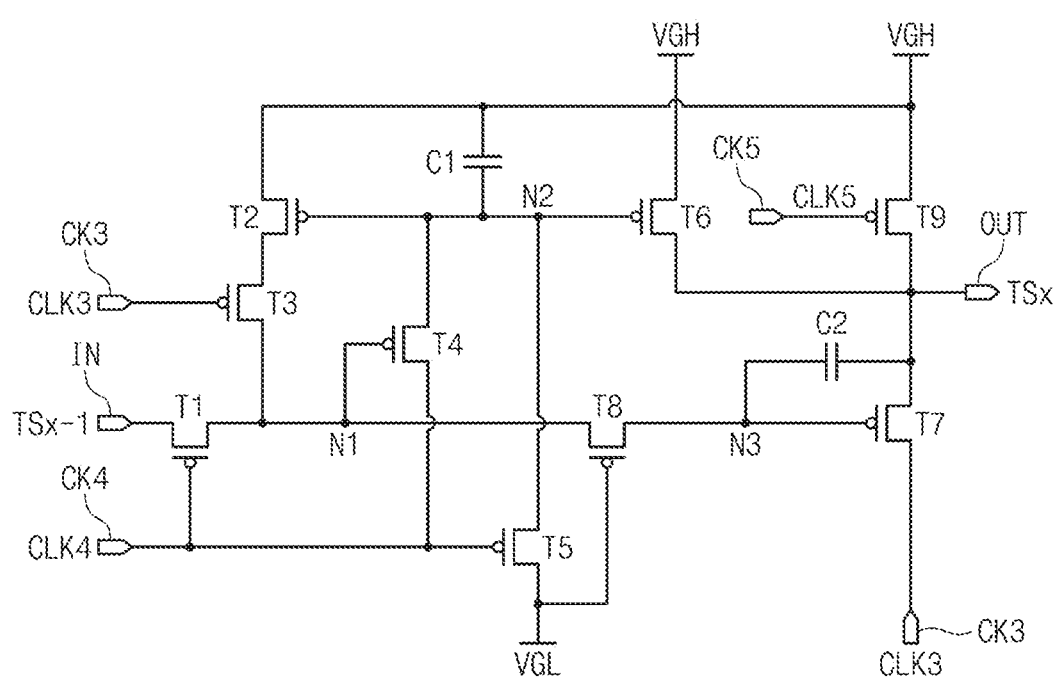
FIG. 15 is an equivalent circuit diagram illustrating the plurality of sense stages illustrated in FIG. 13.

FIG. 13 is a block diagram illustrating the gate driving unit GD and a sense driving unit TD3 according to an exemplary embodiment of the inventive concept, FIG. 14 is a timing diagram illustrating some of signals generated in a display device according to an exemplary embodiment of the inventive concept, and FIG. 15 is an equivalent circuit diagram illustrating the plurality of sense stages TRC1b to TRCkb illustrated in FIG. 13. The elements described above with reference to FIGS. 4 to 6 and 10 to 12 are referred to by the same reference is symbols in FIGS. 13 to 15, and are not described in detail below.

Referring to FIGS. 13 to 15, the gate control signals may include the first clock signal CLK1, the second clock signal CLK2, and the first frame start signal FLM, and the driving control signals may include the third clock signal CLK3, the fourth clock signal CLK4, a fifth clock signal CLK5, and a second frame start signal TXFLM2. The second frame start signal TXFLM2 may be a signal for initiating driving of the sense driving unit TD3.

Each of the sense stages TRC1b to TRCkb includes an input terminal IN, an output terminal OUT, third to fifth clock terminals CK3 to CK5, a first voltage terminal VS1, and a second voltage terminal VS2.

The input terminal IN of each of the sense stages TRC1b to TRCkb may receive an output signal of a previous stage. Referring to FIG. 15, the input terminal IN of an xth sense stage may receive an output signal TSx-1 of an (x-1)th sense stage. However, the input terminal IN of the first sense stage TRC1b may receive the second frame start signal TXFLM2.

The fifth clock signal CLK5 may be a signal which toggles between certain levels. The sense driving signals TS1 to TSk may also toggle between certain levels in response to the fifth clock signal CLK5. The second frame start signal TXFLM2 may also toggle in correspondence with waveforms of the sense driving signals TS1 to TSk.

The gate stages SRC1 to SRCn and the sense stages TRC1b to TRCkb may have different circuit structures. Each of the gate stages SRC1 to SRCn may have the equivalent circuit illustrated in FIG. 6, and each of the sense stages TRC1b to TRCkb may have the equivalent circuit illustrated in FIG. 15.

Compared to the equivalent circuit illustrated in FIG. 6, the equivalent circuit illustrated in FIG. 15 may further include a ninth transistor T9. A first electrode of the ninth is transistor T9 may be connected to the first voltage VGH, a second electrode may be connected to the output terminal OUT, and a control electrode may be connected to the fifth clock terminal CK5. The ninth transistor T9 may control a connection between the output terminal OUT and the first voltage VGH in response to a voltage applied to the fifth clock terminal CK5.

Figure 16:
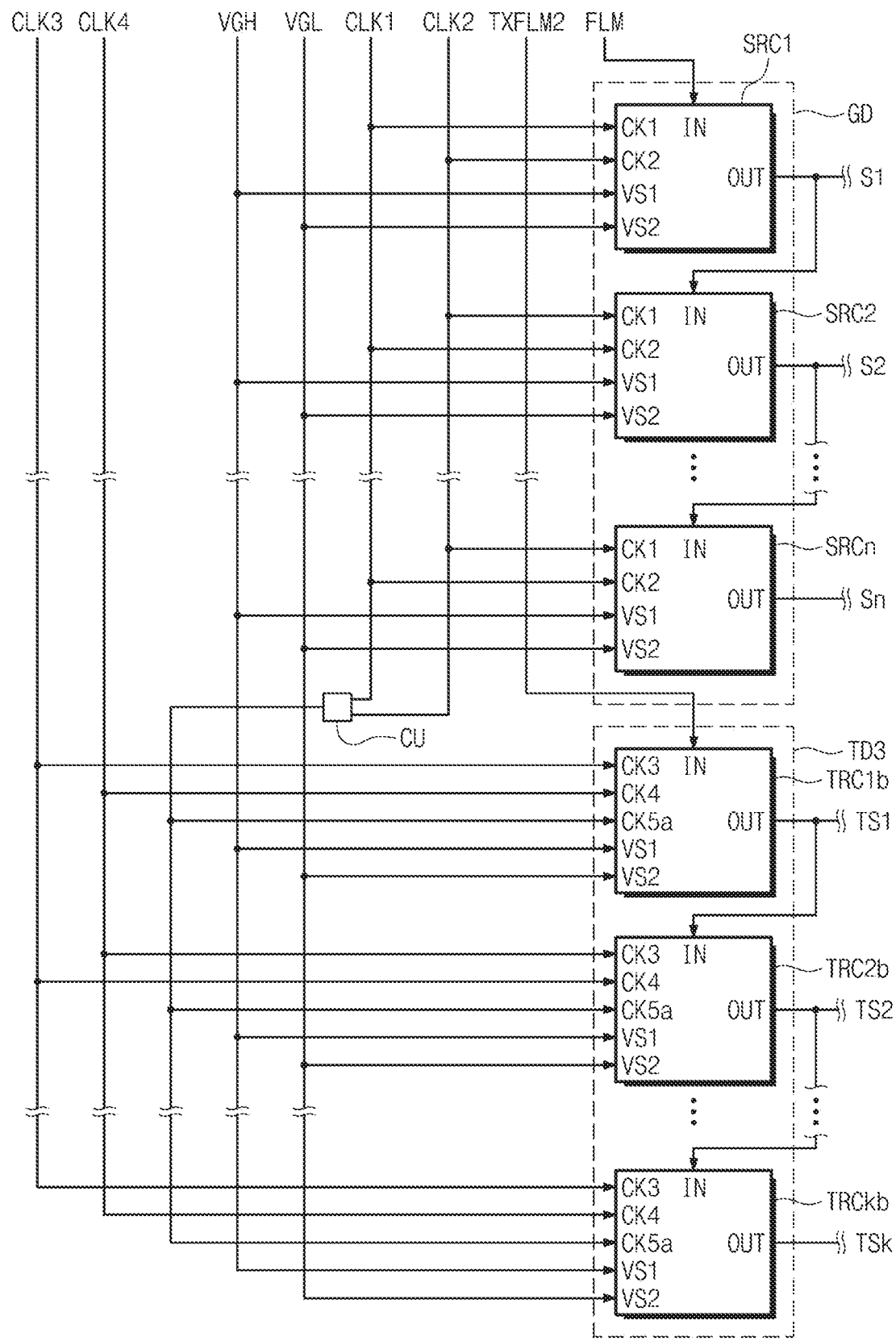
FIG. 16 is a block diagram illustrating a gate driving unit and a sense driving unit according to an exemplary embodiment of the inventive concept.
Figure 17:
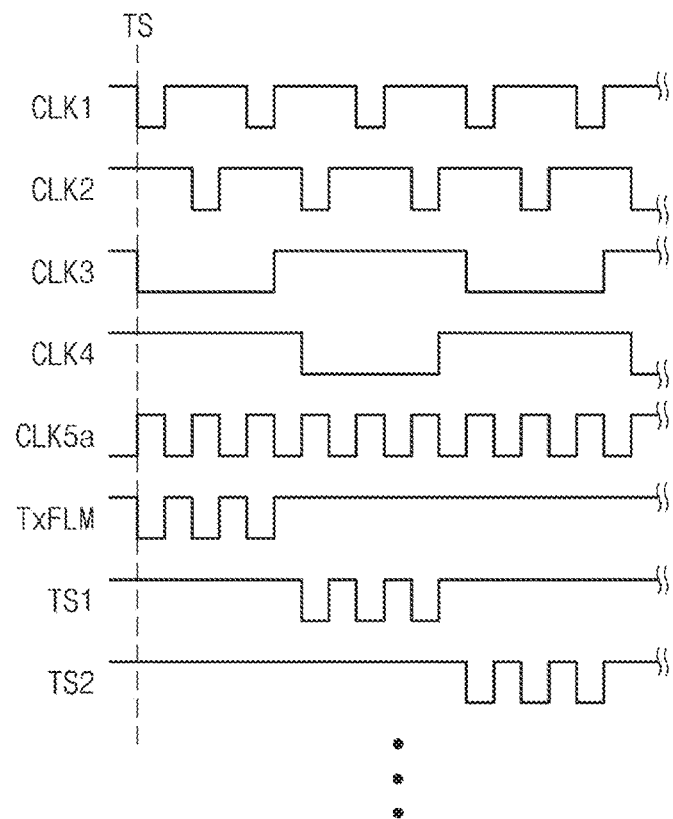
FIG. 17 is a timing diagram illustrating some of signals generated in a display device according to an exemplary embodiment of the inventive concept.
Figure 18:
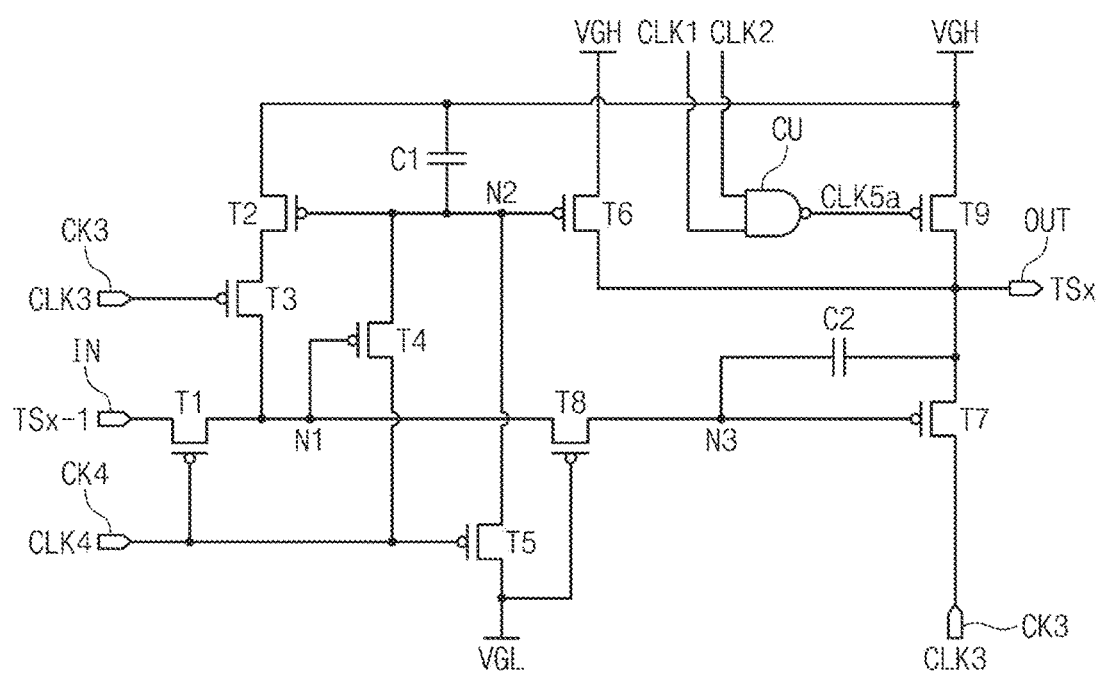
FIG. 18 is an equivalent circuit diagram illustrating the plurality of sense stages illustrated in FIG. 16.

FIG. 16 is a block diagram illustrating the gate driving unit GD and the sense driving unit TD3 according to an exemplary embodiment of the inventive concept, FIG. 17 is a timing diagram illustrating some of signals generated in a display device according to an exemplary embodiment of the inventive concept, and FIG. 18 is an equivalent circuit diagram illustrating the plurality of sense stages TRC1b to TRCkb illustrated in FIG. 16. The elements described above with reference to FIGS. 13 to 15 are referred to by the same reference symbols in FIG. 16, and are not described in detail below.

Referring to FIGS. 16 to 18, a fifth clock signal CLK5a is provided to a fifth clock terminal CK5a of the sense stages TRC1b to TRCkb. The fifth clock signal CLK5a may be generated by gating the first clock signal CLK1 and the second clock signal CLK2. FIG. 16 illustrates a clock generation circuit CU for receiving and gating the first clock signal CLK1 and the second clock signal CLK2.

FIG. 18 illustrates a NAND circuit as an example of the clock generation circuit CU. Therefore, the fifth clock signal CLK5a may have a high level when both the first clock signal CLK1 and the second clock signal CLK2 have a high level, and may have a low level when either the first clock signal CLK1 or the second clock signal CLK2 has a low level.

However, the clock generation circuit CU may be replaced with an AND circuit, an XOR circuit, or an XNOR circuit. In the case where the clock generation circuit CU is an XOR circuit, the fifth clock signal CLK5a may have the same phase as the wave illustrated in is FIG. 17. In the case where the clock generation circuit CU is an AND circuit or an XNOR circuit, the fifth clock signal CLK5a may have a phase opposite to the phase of the wave illustrated in FIG. 17.

Figure 19:
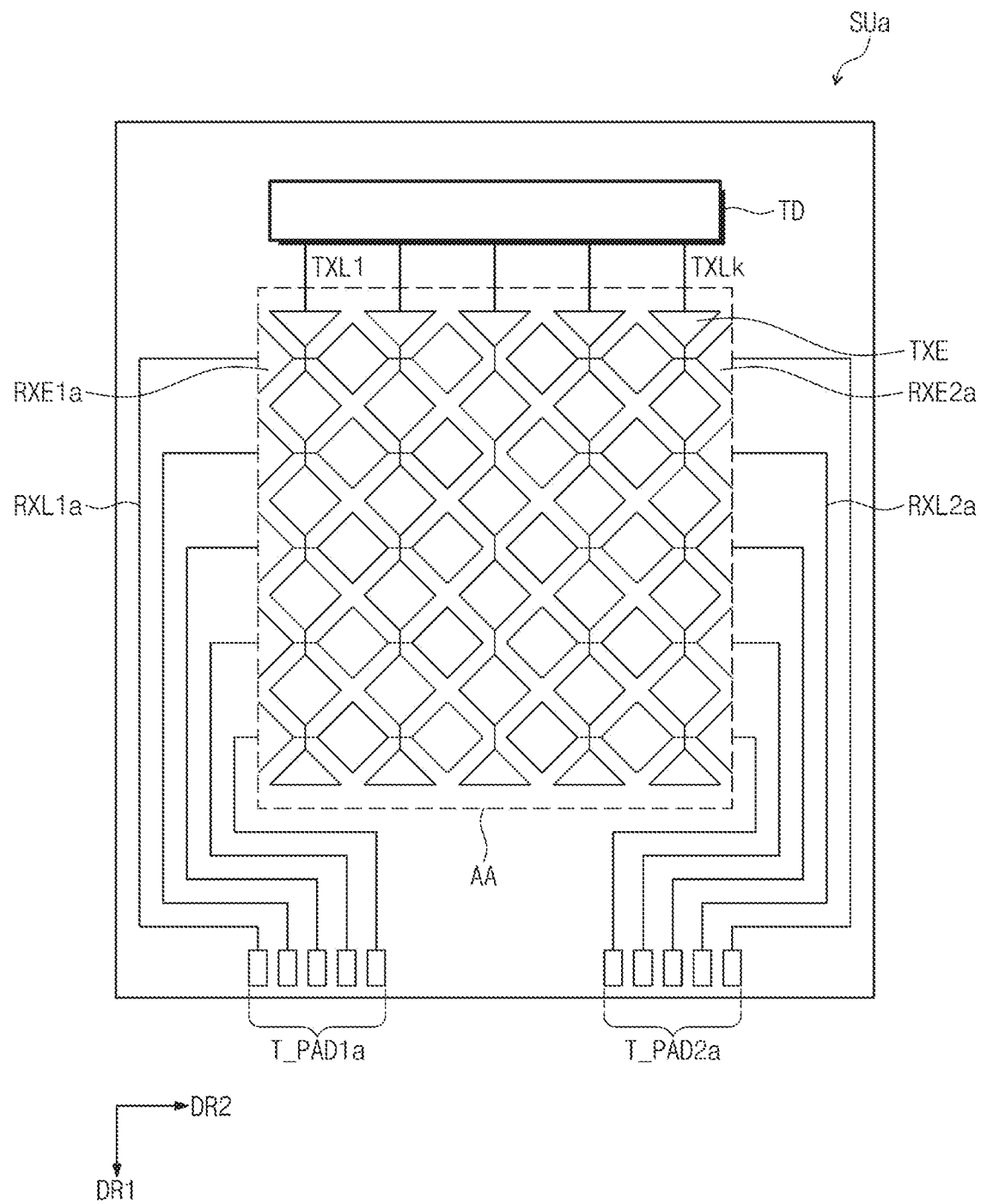
FIG. 19 is a plane view illustrating a part of a sensing unit according to an exemplary embodiment of the inventive concept.

FIG. 19 is a plane view illustrating a part of a sensing unit according to an exemplary embodiment of the inventive concept. The elements described above with reference to FIG. 3 are referred to by the same reference symbols in FIG. 19, and are not described in detail below.

Referring to FIG. 19, a sensing unit SUa includes a plurality of first sensing electrodes RXE1a and a plurality of second sensing electrodes RXE2a.

The plurality of first sensing electrodes RXE1a and the plurality of second sensing electrodes RXE2a may be spaced apart from each other in the second direction DR2 without being connected to each other. Each of the plurality of first and second sensing electrodes RXE1a and RXE2a may extend in the second direction DR2, and the plurality of first and second sensing electrodes RXE1a and RXE2a may be arranged in the first direction DR1.

First wirings RXL1a arranged at one side of the active region AA may be connected to the plurality of first sensing electrodes RXE1a, and second wirings RXL2a arranged at another side of the active region AA may be connected to the plurality of second sensing electrodes REX2a. The first wirings RXL1a may connect the first sensing electrodes RXE1a to first sensing pads T_PAD1a, and the second wirings RXL2a may connect the second sensing electrodes RXE2a to second sensing pads T_PAD2a. A signal sensed through the first sensing electrodes REX1a may be output to an external driving unit via the first sensing pads T_PAD1a, and a signal sensed through the second sensing electrodes RXE2a may be output to the external driving unit via the second sensing pads T_PAD2a.

An area occupied by one sensing electrode of the sensing unit SUa of FIG. 19 may be smaller than an area occupied by one sensing electrode of FIG. 3. Accordingly, this may be advantageous in terms of reducing noise and in case of a multi-touch situation.

Figure 20:
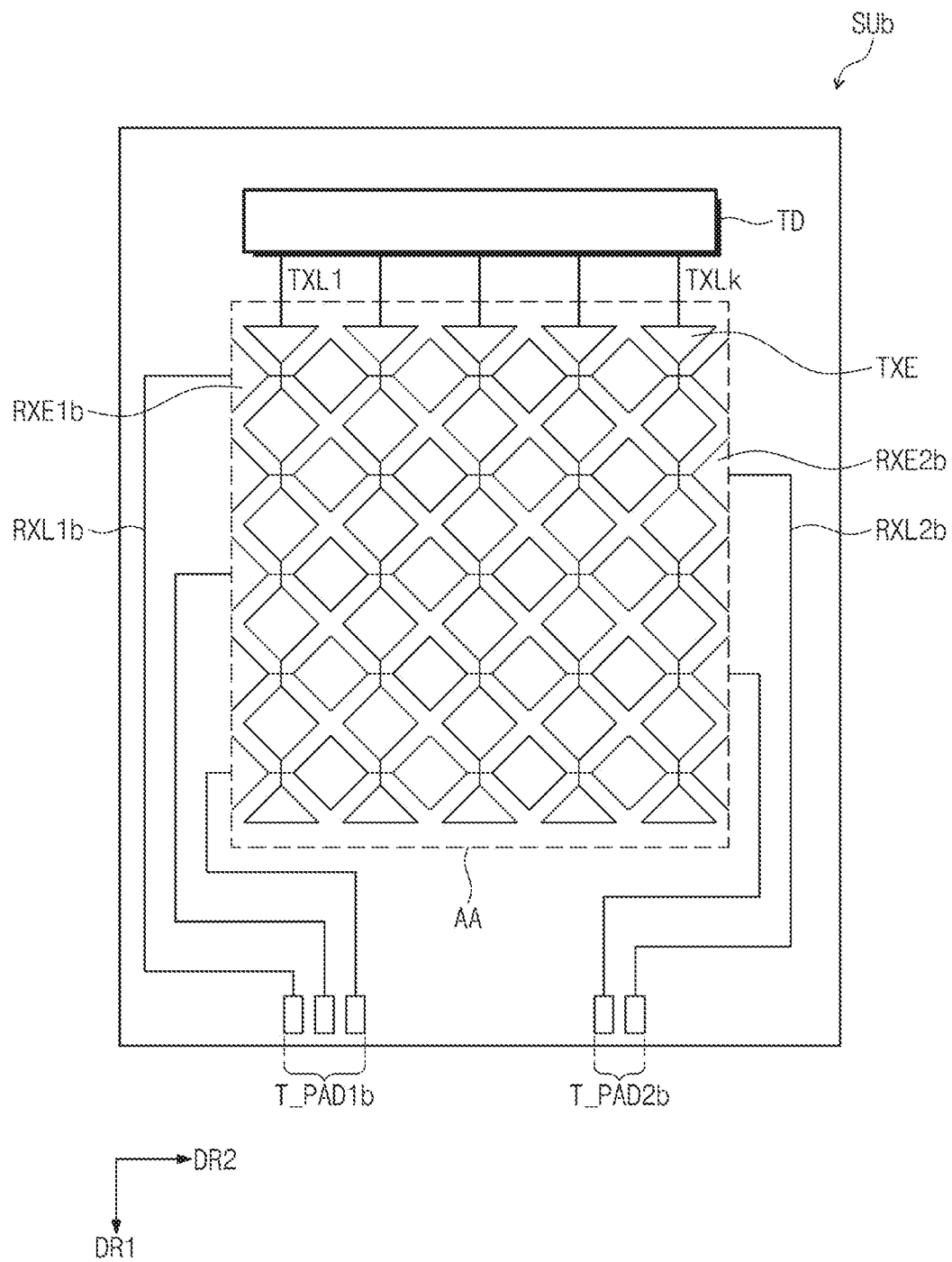
FIG. 20 is a plane view illustrating a part of a sensing unit according to an exemplary embodiment of the inventive concept.

FIG. 20 is a plane view illustrating a part of a sensing unit according to an exemplary embodiment of the inventive concept. The elements described above with reference to FIG. 3 are referred to by the same reference symbols in FIG. 20, and are not described in detail below.

Referring to FIG. 20, a sensing unit SUb includes a plurality of first sensing electrodes RXE1b and a plurality of second sensing electrodes RXE2b.

Each of the plurality of first and second sensing electrodes RXE1b and RXE2b may extend in the second direction DR2, and the plurality of first and second sensing electrodes RXE1b and RXE2b may be alternately arranged in the first direction DR1.

The first sensing electrodes RXE1b may be connected to first wirings RXL1b arranged at one side of the active region AA, and the second sensing electrodes RXE2b may be connected to second wirings RXL2b arranged at another side of the active region AA. In this case, the number of wirings arranged at the outer periphery of the active region AA may be smaller than the number of wirings illustrated in FIG. 3 or 19. Accordingly, the area of the outer periphery may be reduced.

According to exemplary embodiments of the inventive concept, a sense driving unit which provides a driving signal applied to a plurality of driving electrodes is separately provided from a touch IC connected to sensing pads. Therefore, it may not be necessary to provide pads for externally receiving a signal to be applied to the driving electrodes and wirings for connecting the pads and the driving electrodes. Therefore, wirings arranged at an outer is periphery of an active region may be simplified, and thus a margin of wiring arrangement design may be improved, and an area of the outer periphery may be reduced.

Although the exemplary embodiments of the present invention have been described, it is understood that the present invention should not be limited to these exemplary embodiments but various changes and modifications can be made by one ordinary skilled in the art within the spirit and scope of the present invention as hereinafter claimed.

What is claimed is:

1. A display device comprising:
   a display panel comprising a base film and a circuit layer disposed on the base film, the circuit layer comprising a plurality of gate lines, a plurality of data lines, a sense driving unit, and a gate driving unit configured to receive a plurality of gate control signals and provide a gate signal to the plurality of gate lines; and
   a sensing unit comprising a plurality of driving electrodes, a plurality of sensing electrodes, the sense driving unit configured to receive a plurality of driving control signals and provide a sense driving signal to the plurality of driving electrodes, and plurality of sensing pads configured to transfer, to the outside, an electric signal received from each of the plurality of sensing electrodes, wherein:
   the gate driving unit comprises a plurality of gate stages,
   the sense driving unit comprises a plurality of sense stages,
   the plurality of gate stages and the plurality of sense stages are arranged in the same layer,
   the plurality of gate control signals comprise a first clock signal, a second clock signal, and a frame start signal,
   the plurality of driving control signals comprise the first clock signal and the second clock signal,
   a first gate stage among the plurality of gate stages receives the frame start signal, and the plurality of gate stages and the plurality of sense stages are electrically connected.

2. The display device of claim 1, wherein a first sense stage among the plurality of sense stages receives a signal output from an nth gate stage (where n is a positive integer) among the plurality of gate stages.

3. The display device of claim 1,
   wherein the circuit layer further comprises a dummy unit electrically connected to the gate driving unit and the sense driving unit,
   wherein the dummy unit comprises at least one dummy stage connected between an nth gate stage (where n is a positive integer) among the plurality of gate stages and a first sense stage among the plurality of sense stages.

4. The display device of claim 3, wherein the first sense stage receives a signal output from the dummy stage.

5. The display device of claim 1,
   wherein the plurality of driving control signals further comprise a sense start signal,
   wherein a first sense stage among the plurality of sense stages receives the sense start signal.

6. The display device of claim 1, wherein each of the plurality of gate stages and each of the plurality of sense stages comprise the same circuit structure.

7. A display device comprising:
   a display panel comprising a base film and a circuit layer disposed on the base film, the circuit layer comprising a plurality of gate lines, a plurality of data lines, a sense driving unit, and a gate driving unit configured to receive a plurality of gate control signals and provide a gate signal to the plurality of gate lines; and
   a sensing unit comprising a plurality of driving electrodes, a plurality of sensing electrodes, the sense driving unit configured to receive a plurality of driving control signals and provide a sense driving signal to the plurality of driving electrodes, and plurality of sensing pads configured to transfer, to the outside, an electric signal received from each of the plurality of sensing electrodes, wherein:
   the gate driving unit comprises a plurality of gate stages,
   the sense driving unit comprises a plurality of sense stages,
   the plurality of gate stages and the plurality of sense stages are arranged in the same layer,
   the plurality of gate control signals comprise a first clock signal, a second clock signal, and a first frame start signal,
   the plurality of driving control signals comprise a third clock signal, a fourth clock signal, and a second frame start signal different from the first frame start signal, and
   a first gate stage among the plurality of gate stages receives the first frame start signal, each of the plurality of gate stages receives the first clock signal and the second clock signal, a first sense stage among the plurality of sense stages receives the second frame start signal, and each of the plurality of sense stages receives the third clock signal and the fourth clock signal.

8. The display device of claim 7, wherein the plurality of driving control signals further comprise a fifth clock signal, and each of the plurality of sense stages receives the fifth clock signal.

9. The display device of claim 8, further comprising a clock generation circuit configured to generate the fifth clock signal by gating the first clock signal and the second clock signal.

10. The display device of claim 9, wherein the clock generation circuit comprises an AND circuit, a NAND circuit, an XOR circuit, or an XNOR circuit.

11. The display device of claim 7, wherein the plurality of gate stages and the plurality of sense stages comprise different circuit structures.

12. The display device of claim 1,
    wherein each of the plurality of driving electrodes extends in a first direction, the plurality of driving electrodes are arranged in a second direction crossing the first direction, each of the plurality of sensing electrodes extends in the second direction, and the plurality of sensing electrodes are arranged in the first direction,
    wherein each of the plurality of gate lines extends in the second direction, the plurality of gate lines are arranged in the first direction, each of the plurality of data lines extends in the first direction, and the plurality of data lines are arranged in the second direction.

* * * * *